United States Patent [19]

Kodimer

[11] Patent Number: 5,781,192

[45] Date of Patent: Jul. 14, 1998

[54] DATA TRANSFER SYSTEM

[75] Inventor: Marianne L. Kodimer, Anaheim, Calif.

[73] Assignee: Canon Information Systems, Inc., Irvine, Calif.

[21] Appl. No.: 586,092

[22] Filed: Jan. 16, 1996

[51] Int. Cl.[6] ........................................................ G06F 3/00
[52] U.S. Cl. .............................................. 345/340; 345/346
[58] Field of Search ................................. 395/340, 339, 395/343, 326; 345/340, 328, 329, 341, 342, 343, 344, 346, 347, 348, 352, 353, 359; 707/531

[56] References Cited

U.S. PATENT DOCUMENTS

| 4,975,890 | 12/1990 | Torres | 345/340 |
|---|---|---|---|
| 5,070,478 | 12/1991 | Abbott | 707/531 |
| 5,430,836 | 7/1995 | Wolf et al. | 345/340 |
| 5,519,862 | 5/1996 | Schaeffer et al. | 395/701 |
| 5,548,740 | 8/1996 | Kiyohara | 711/100 |

OTHER PUBLICATIONS

IBM Technical Disclosure Bulletin, vol. 37, No. 3, Mar., 1994, pp. 325–326, "Cascade Clipboards: Accessing Multiple Clipboards".

IBM Technical Disclosure Bulletin, vol. 36, No. 6B, Jun., 1993, pp. 271–272, "Append Feature for Clipboards".

Research Disclosure, No. 3347, Mar., 1993, p. 200, "Enhancing the Single Level Clipboard to Provide Multiple Layers Graphically".

F. Davis, "The Windows 3.1 Bible", Peachpit Press, Inc., 1993, pp. 26–27, 68–70, 264–265, 301–304, 315–316, 497–500, 505, 508, 525–526, 745–748 and 752.

C. Petzold, "Programming Windows 3.1", Microsoft Press, 1992, Chapter 16, pp. 791–822.

Simpson, *Mastering WordPerfect ® 5.1 & 5.2 for Windows*, Alameda, Ca., 1993.

*Primary Examiner*—Matthew M. Kim
*Assistant Examiner*—Steven P. Sax
*Attorney, Agent, or Firm*—Fitzpatrick, Cella, Harper & Scinto

[57] ABSTRACT

A computer implemented method for storing data from an instance of an application program into at least one of a plurality of buffers includes the steps of bringing an application program into focus, selecting data in the application program, selecting a store operation such as a "cut" or a "copy" operation while the application program is in focus, selecting one of the buffers while the application program is still in focus, and automatically storing the selected data into the selected one of the buffers. In a similar manner, data can be recalled from the buffers, such as in a "paste" operation, and any one of the buffers selected, without ever leaving focus of the application to which the data is recalled.

81 Claims, 26 Drawing Sheets

DATA TRANSFER SYSTEM

BACKGROUND OF THE INVENTION

1. Field Of The Invention

The present invention concerns a computer-implemented data transfer system which, in a windowing environment, manages multiple memory buffers so as to permit data transfer within or between different application programs. More particularly, the invention allows a user to store multiple data selections into different ones of the multiple memory buffers without leaving focus from an instance of an application program.

2. Description of the Related Art

One advantage of windowing environments is the ability to transfer data easily from one application program to another. A user simply launches both applications (multi-tasking being another advantage of windowing environments), sets focus on the first application and selects data in that application, stores the selected data to a memory buffer, switches focus to the second application, and recalls the data from the memory buffer to the second application.

Conventional windowing environments, such as that provided by Microsoft Window's version 3.1 ("Windows" hereinafter), have only a single memory buffer for transferring data within and between different application programs. In Windows, this buffer is called the clipboard. Because there is only a single memory buffer, whenever data is transferred into the buffer, any old data stored there is lost. This arrangement makes it difficult for a user to transfer multiple data selections, since to avoid data loss a transfer operation for each data selection must be completed before each subsequent data selection can be made.

For example, in order to transfer two data selections from a first application program to a second application program, the following steps are necessary: (1) the first application program must be brought into focus; (2) the first data selection in the first application program must be selected; (3) the data selection must be stored into the clipboard; (4) the second application program must be brought into focus; (5) the position where the data is to be transferred to must be selected; (6) the data must be recalled from the clipboard to the selected position in the second application program; (7) the first application program must be brought back into focus; (8) the second data selection must be selected in the first application program; (9) the second data selection must be stored to the clipboard; (10) the second application program must be brought back into focus; (11) the position where the second data selection is to be transferred to must be selected; and (12) the second data selection must be recalled from the clipboard to the selected position in the second application program.

This cumbersome process is a needless waste of the user's time and efforts, both in terms of the number of steps involved and in terms of the number of times that the user must shuffle between various windows. In addition, the user is restricted to dealing with a single data selection at a time. Since a user can not deal with multiple data selections at the same time, the user can easily forget which one of the multiple data transfers he is currently trying to make, as well as forget how far in a current data transfer he has already progressed.

"Clipbooks" or "scrapbooks" are known attempts to address the difficulties encountered in copying multiple data selections. Clipbooks or scrapbooks are application programs that contain multiple pages, each of which can store one data selection, so as to allow a user to make multiple data selections without losing prior data selections. However, after each data selection, it is necessary to shift focus away from the application from which data is copied, so as to permit designation of one of the multiple pages onto which the data is stored. This is illustrated in the following example with reference to FIGS. 14(a) to 14(r). In connection with these figures, and throughout the remainder of this specification, the terms "copy" and "paste", as well as "cut" and "paste", are given their conventionally accepted meanings, as defined, for example, in F. Davis, "The Windows 3.1 Bible", Peachpit Press, 1993.

FIG. 14(a) shows a computer display with two application programs, APP-1 210 and APP-2 220, clipbook 250, and cursor 200. In FIG. 14(b), APP-1 210 is brought into focus, as shown by the double border around its window, and text data selection 212 is selected, as depicted by the thick border around the five lines at the top of APP-1 210. In FIG. 14(c), text data 212 is copied into the clipboard (not shown) by use of edit pull-down menu 213. In FIG. 14(d), clipbook 250 is brought into focus, as indicated by the double border surrounding its window. In addition, scroll bar 251 is used to select page 2 in clipbook 250. In FIG. 14(e), text data selection 212 is pasted into page 2 of clipbook 250 by use of edit pull-down menu 253. In FIG. 14(f), APP-2 220 is brought into focus and graphic data selection 222 is selected. In FIG. 14(g), graphic data selection 222 is cut into the clipboard by use of edit pull-down menu 223. (As is known, because the data is "cut" rather than "copied" into the clipboard, graphic data selection 222 is deleted from APP-2 220.) In FIG. 14(h), clipbook 250 is brought into focus and page 1 of clipbook 250 is selected by page pull-down menu 255. In FIG. 14(i), graphic data selection 222 is pasted into page 1 of clipbook 250 by use of edit pull-down menu 253.

At this point, two data selections, text data 212 and graphic data 222, are copied into two different pages of clipbook 250. Now, the user can close APP-1 210 and APP-2 220 and open another application into which data selections can be transferred, as described below in connection with FIGS. 14(j) through 14(r).

FIG. 14(j) shows newly opened APP-4 240 and clipbook 250. In FIG. 14(k), clipbook 250 is brought into focus and graphic data selection 222 is selected. In FIG. 14(l), graphic data selection 222 is copied from page 1 of the clipbook into the clipboard (not shown) by use of edit pull-down menu 253. In FIG. 14(m), APP-4 240 is brought into focus and position 242 in APP-4 240 is selected with cursor 200. In FIG. 14(n), graphic data selection 222 is pasted into APP-4 240 by use of edit pulldown menu 243. In FIG. 14(o), clipbook 250 is brought back into focus and page 2 of clipbook 250 is selected with page pull-down menu 255. In FIG. 14(p), text data selection 212 is copied into the clipboard (not shown) by use of edit pull-down menu 253. In FIG. 14(q), APP-4 240 is brought back into focus and position 242 is selected. Finally, in FIG. 14(r), text data selection 212 is pasted into APP-4 240 by use of edit pull-down menu 243.

Thus, even though clipbooks and the like allow a user to make multiple data selections without losing data from a prior selection, because a user must shift focus away from the application after each data selection, use of such clipbooks is a cumbersome and unnecessarily lengthy procedure.

Accordingly, there exists a need to allow a user to make multiple data selections without leaving focus from a single application, and to allow a user to transfer multiple data selections within and between applications.

SUMMARY OF THE INVENTION

These needs are addressed by the present invention by providing a data transfer system with multiple memory buffers. each of which can be selected without leaving focus from a currently-active application. By virtue of this operation. the user can move multiple data selections within and between application programs without needless shuffling between the application programs and their respective windows, saving the user considerable time and effort.

According to one aspect of the present invention, a computer implemented method for transferring data from a first application program into at least one of a plurality of memory buffers comprises the steps of bring the application program into focus, selecting data in the application program, selecting a "copy" or a "cut" operation while the application program is still in focus, selecting one of the memory buffers while the application program is still in focus, and automatically storing the selected data into the selected one of the memory buffers. Multiple "copy" or "cut" operations can be made without ever leaving focus of the application program.

Thereafter, data can be recalled from any one of the plurality of memory buffers into a second application program by bringing the second application program into focus, selecting a position in the second application program (if necessary), selecting a "paste" operation while the second application program is still in focus, selecting one of the memory buffers while the second application program is still in focus, and automatically recalling data from the selected one of the memory buffers to the selected position in the second application program. Multiple "paste" operations can be made without ever leaving focus of the second application program.

In another aspect of the present invention. a method for transferring data from a first application to a second application using one of a plurality of memory buffers comprises the steps of bringing the first application into focus, selecting data from the first application, selecting one of the plurality of memory buffers while the first application remains in focus, storing the selected data to the selected one of the plurality of editing buffers, bringing the second application into focus, selecting a position for transferring data into the second application (if necessary), re-selecting the selected one of the plurality of memory buffers while the second application is in focus, and recalling data from the re-selected one of the plurality of memory buffers to the selected position in the second application.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
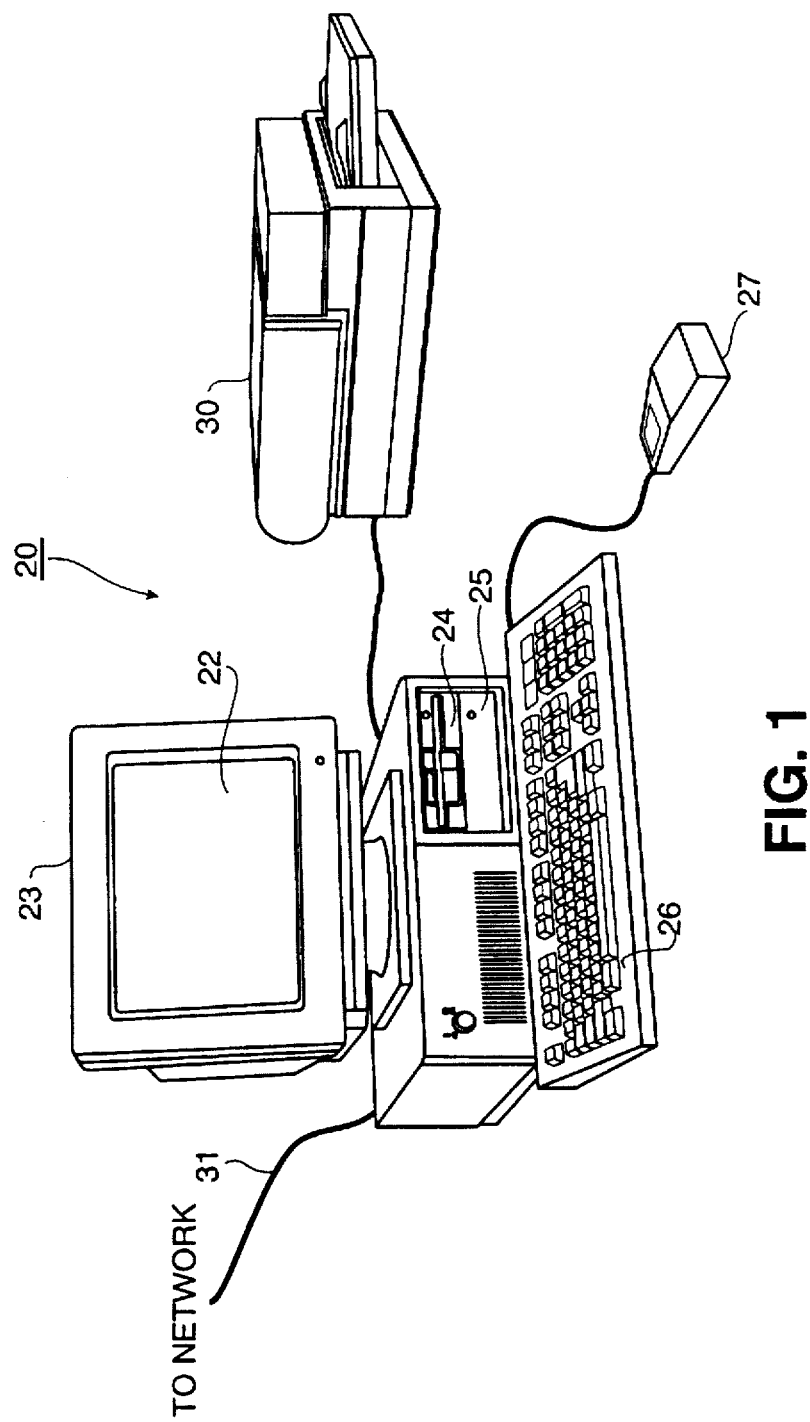
FIG. 1 is a view showing the outward appearance of representative computing equipment.

FIG. 1 is a view showing the outward appearance of representative computing equipment incorporating the invention and which can be used for many purposes. possibly including word processing. graphics design, spreadsheets, etc.

Shown in FIG. 1 is computing equipment 20 such as an IBM-PC or PC compatible computer having a windowing operating system such as Windows. Computing equipment 20 is provided with monochromatic or color display monitor 23 having display screen 22. on which computing equipment 20 displays images to the user. Computing equipment 20 is further provided with floppy disk drive 24 with which removable disk media may be read or written. A CD-ROM driver can be used in place of or in addition to floppy disk drive 24.

Computing equipment 20 is also equipped with fixed disk drive 25 as one possible medium for storing the windowing operating system as well as data files and application programs, keyboard 26 for permitting input of text data and manipulation of objects displayed on display screen 22, and pointing device 27. such as a mouse. which is provided for pointing and for manipulating objects displayed on display screen 22. If desired, printer 30 may be provided for outputting documents processed by computing equipment 20.

Also provided are conventional connections to other data and application storage media. such as connection 31 to a network.

In accordance with user instructions, and under control of the windowing operating system, stored application programs such as desktop publishing application programs, drawing application programs, word processing application programs, and the like, are selectively activated to process and to manipulate data.

Figure 2:
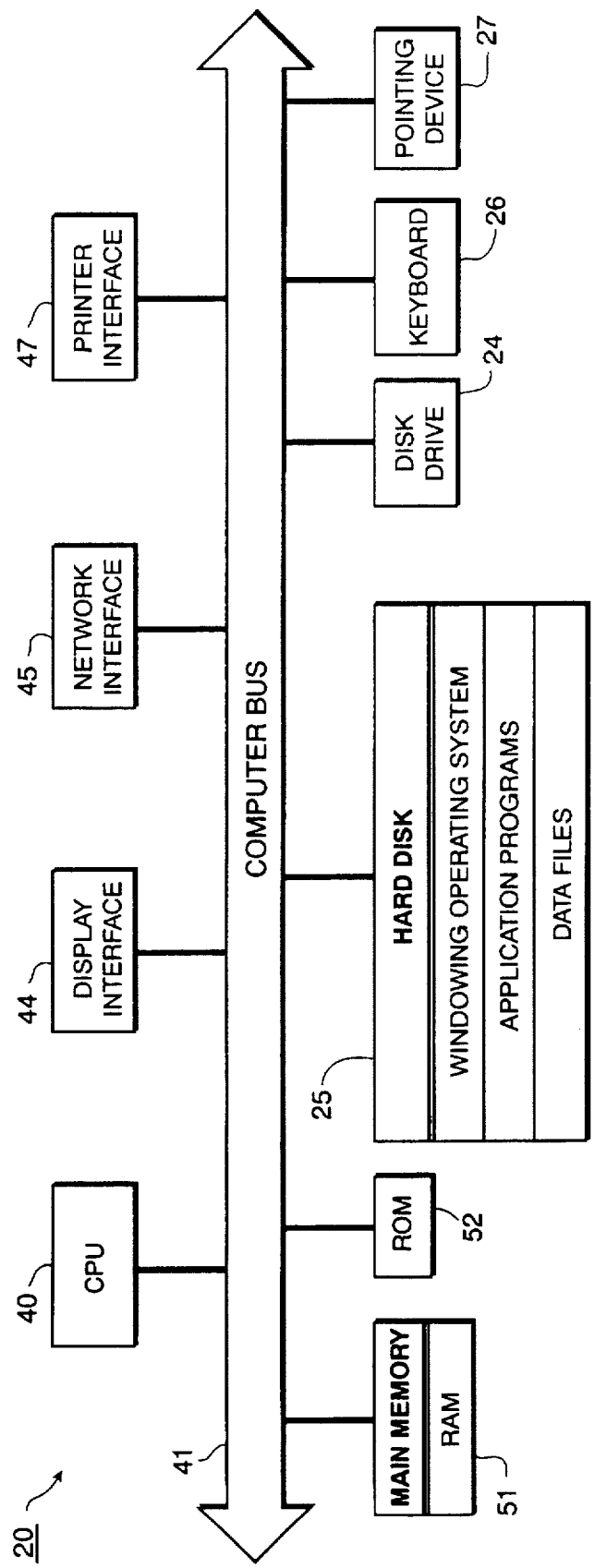
FIG. 2 is a detailed block diagram showing the internal construction of computing equipment as shown in FIG. 1.

FIG. 2 is a detailed block diagram showing one possible internal construction of computing equipment 20. As shown in FIG. 2, computing equipment 20 includes a central processing unit (CPU) 40 such as a programmable microprocessor interfaced to computer bus 41. Also interfaced to computer bus 41 are display interface 44, network interface 45, printer interface 47, floppy disk drive 24, keyboard 26, pointing device 27, main memory 51, read only memory (ROM) 52, and fixed disk 25. Other interfaces may be provided, as appropriate to the overall configuration of computing equipment 20.

Main memory 51, such as random access memory (RAM), interfaces to computer bus 41 so as to provide CPU 40 with access to memory storage. In particular, when executing stored application program instruction sequences such as those associated with application programs stored on fixed disk 25, CPU 40 loads those instruction sequences from fixed disk 25 (or other storage media such as media accessed via network interface 45 or floppy disk drive 24) into main memory 51 and executes those stored program instruction sequences out of main memory 51.

ROM 52 is provided for storing invariant instruction sequences such as start-up instruction sequences of basic input/output operating system (BIOS) sequences for operation of keyboard 26.

As shown in FIG. 2, fixed disk 25 stores program instruction sequences for windowing operating systems and various application programs, document files, and other data files. Fixed disk 25 can also store any number of other types of files.

|Windowing Operating System|

A user interacts with application programs by means of the windowing operating system. This operating system is used to start instances of application programs, to interact with those application programs, and to close instances of application programs.

An instance of an application program is simply one copy of an application program that is running at one time. Multiple instances of a single application program can be run at once. Each instance is typically represented by a window or windows. Each instance of an application program has its own data, and is a separate entity from the perspective of the user.

|Data Transfer System|

Figure 3:
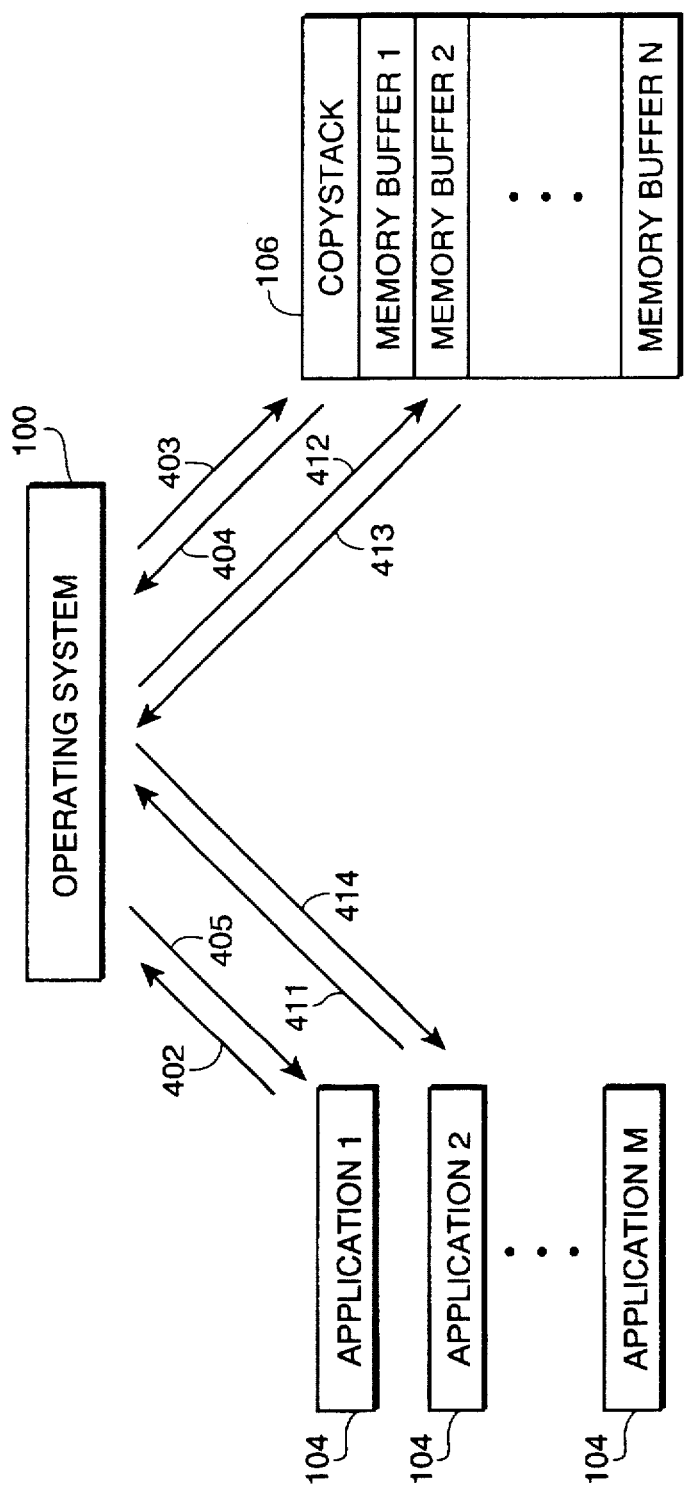
FIG. 3 is a functional block diagram used to explain messaging between a windowing operating system and multiple applications and multiple memory buffers in a data transfer system using multiple memory buffers.

FIG. 3 is a functional block diagram showing the interactions between user inputs, window operating system 100, applications 104, and a "copystack" memory 106 for a data transfer system with multiple memory buffers for storing data selected from an application to a selected one of the multiple memory buffers. Preferably, the number of memory buffers in copystack 106 is automatically increased, up to some predetermined number such as 20, by the windowing operating system 100 so that there is at least one blank memory buffer into which new data can be stored. The memory buffers are system-wide buffers in that they can be accessed by any application program running under windowing operating system 100.

In FIG. 3, the copystack and data transfer system are treated as part of the windowing operating system. It should be understood, however, that other arrangements are possible. For example, one other possible implementation is to provide multiple system wide memory buffers separate from the windowing operating system, such as in an add-on utility or through use of OLE ("object linking and embedding") 2.0 protocol. As another possible implementation, the multiple memory buffers might be included by pre-arrangement in a suite of software applications.

In FIG. 3, the data transfer system involves interaction among windowing operating system 100, applications 104, and copystack 106 for multiple memory buffers. The user input 102 is via a graphical user interface (GUI).

Figure 4A:
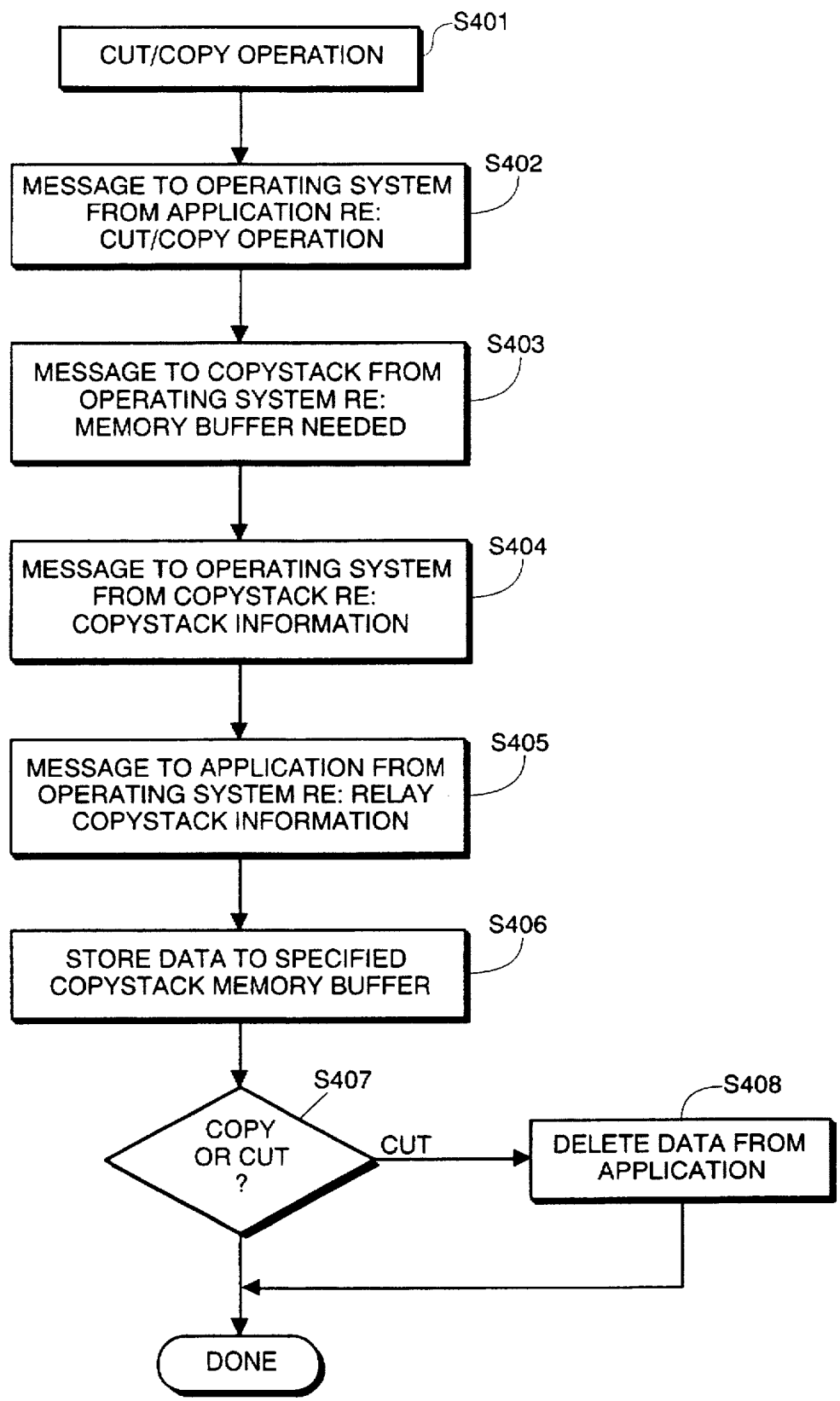
FIG. 4(a) is a flow chart showing operation of the data transfer system during a "cut" or "copy" operation when storing data from an application program to one of multiple memory buffers.

FIG. 4(a) is a flow diagram illustrating execution of stored program instruction sequences by which the data transfer system operates during a "cut" or "copy" operation so as to store data from an application program to a user-selected one of multiple memory buffers. Thus, in response to user designation of a "cut" or "copy" operation in step S401, flow advances to step S402 in which the active application sends a message (depicted at 402 in FIG. 3) to operating system 100 advising the operating system that the user has selected a "cut" or "copy" operation, and requesting operating system 100 to provide data needed by the application so as to effectuate the "cut" or "copy" operation. Such data might include, for example, the location of a memory buffer into which data from the application should be stored, as well as data needed by the application so as to draw an appropriate menu for the user to select desired parameters (such as total number of memory buffers in the copystack, type of data stored in each memory buffer, and the like) for the "cut" or "copy" operation. Operating system 100 responds in step S403 by sending a message to copystack 106 (depicted at 403 in FIG. 3) advising copystack 106 that a memory buffer is needed for a "cut" or "copy" operation. Copystack 106 responds by reserving memory for a new memory buffer and, in step S404, sending a message (depicted at 404 in FIG. 3) to operating system 100 relaying copystack information such as the location of the new memory buffer, the total number of memory buffers now available for a "copy" or "cut" operation, and the kind of data (such as text, graphic, spreadsheet, etc) in each of the different memory buffers. In step S405, the operating system sends a message (depicted at 405 in FIG. 3) to the application so as to relay the copystack information. At step S406, the application stores data selected by the user to a user-specified copystack memory buffer (or, in the absence of user specification, to the default copystack memory buffer), whereafter data is optionally deleted at step S408 in dependence on whether a user has specified a "cut" operation or a "copy" operation (step S407).

Figure 4B:
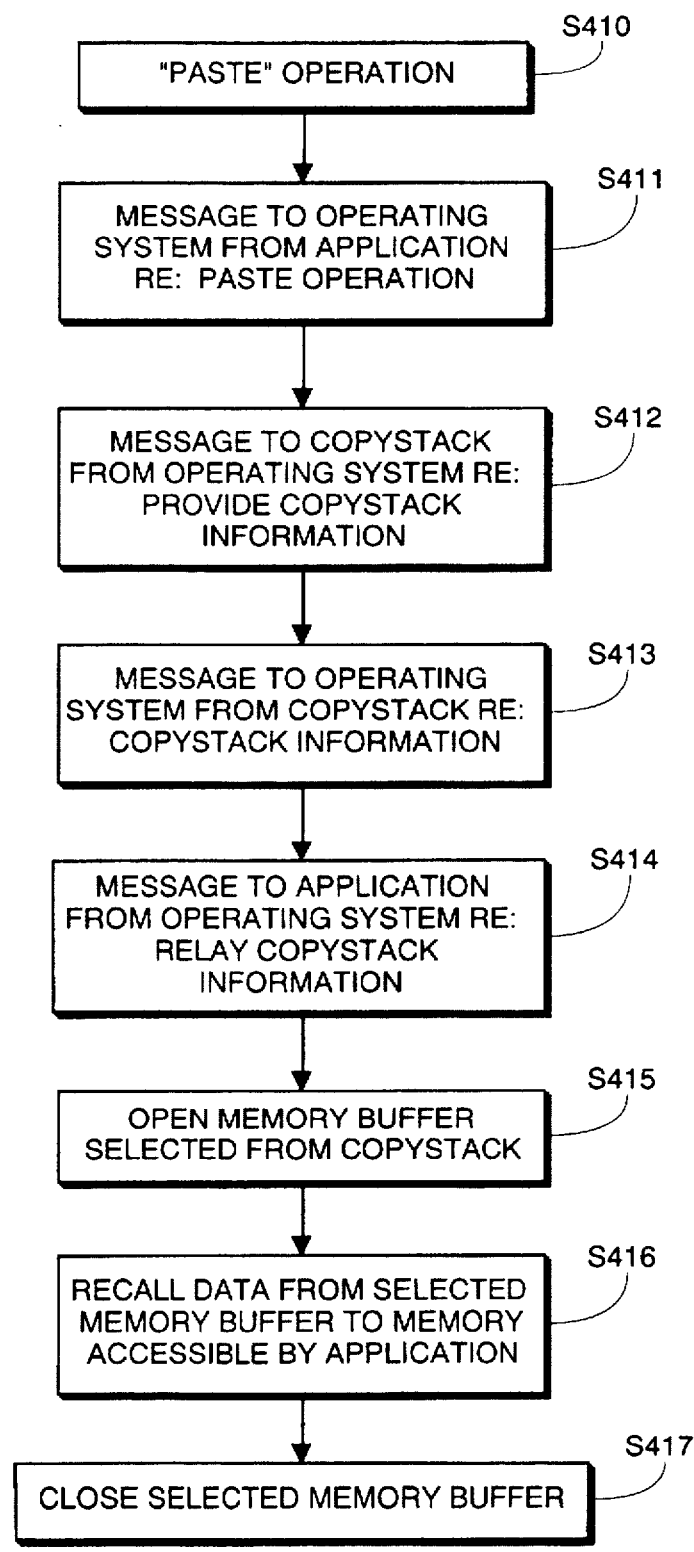
FIG. 4(b) is a flow chart showing the operation of the data transfer system during a "paste" operation when recalling data from one of multiple memory buffers into an application program.

FIG. 4(b) is a flow diagram illustrating the stored program instruction steps executed by the data transfer system during a "paste" operation so as to recall data from one of the multiple memory buffers in copystack 106 to an active application program.

Thus, in response to a user selection of a "paste" operation (step S410), flow advances to step S411 in which the active application sends a message (depicted at 411 in FIG. 3) to operating system 100 advising operating system 100 of the "paste" operation. In step S412, operating system 100 sends a message (depicted at 412 in FIG. 3) to copystack 106 requesting for copystack 106 to provide copystack information. Copystack 106 responds in step S413 by sending a message (depicted at 413 in FIG. 3) to operating system 100 with the needed copystack information, namely the number and locations of memory buffers currently being managed by copystack 106, as well as the type of data stored in each memory buffer, the identity of the last-accessed memory buffer and the like. Flow advances to step S414 in which operating system 100 sends a message (depicted at 414 in FIG. 3) to the active application relaying copystack information. Based on the copystack information so provided, the active application draws an appropriate menu for the user to designate parameters for the "paste" operation, such as which of the multiple memory buffers to recall data from. In step S416, after selection of one of the multiple memory buffers (which may be by user-selection or by default selection such as the last-accessed memory buffer), data is recalled from the selected memory buffer to memory which is accessible by the active application. Thereafter, in step S417, the selected memory buffer is closed.

The above operations of the data transfer system do not distinguish between application programs and instances of application programs. From the perspective of an application program, each instance of the application program is simply another segment of data. The application determines what data to "copy" or where to "paste" data based in part on which instance of the application those editing commands originate from. The instance of the application program may also affect the selection of the data type. Otherwise, the particular instance of the application program generally does not affect the steps discussed above.

[Selecting Editing Buffers And Data]

FIGS. 5 to 11(b) show, from the user's perspective, operational examples of the above data transfer system in transferring multiple data selections between multiple application programs without leaving focus.

Figure 5:
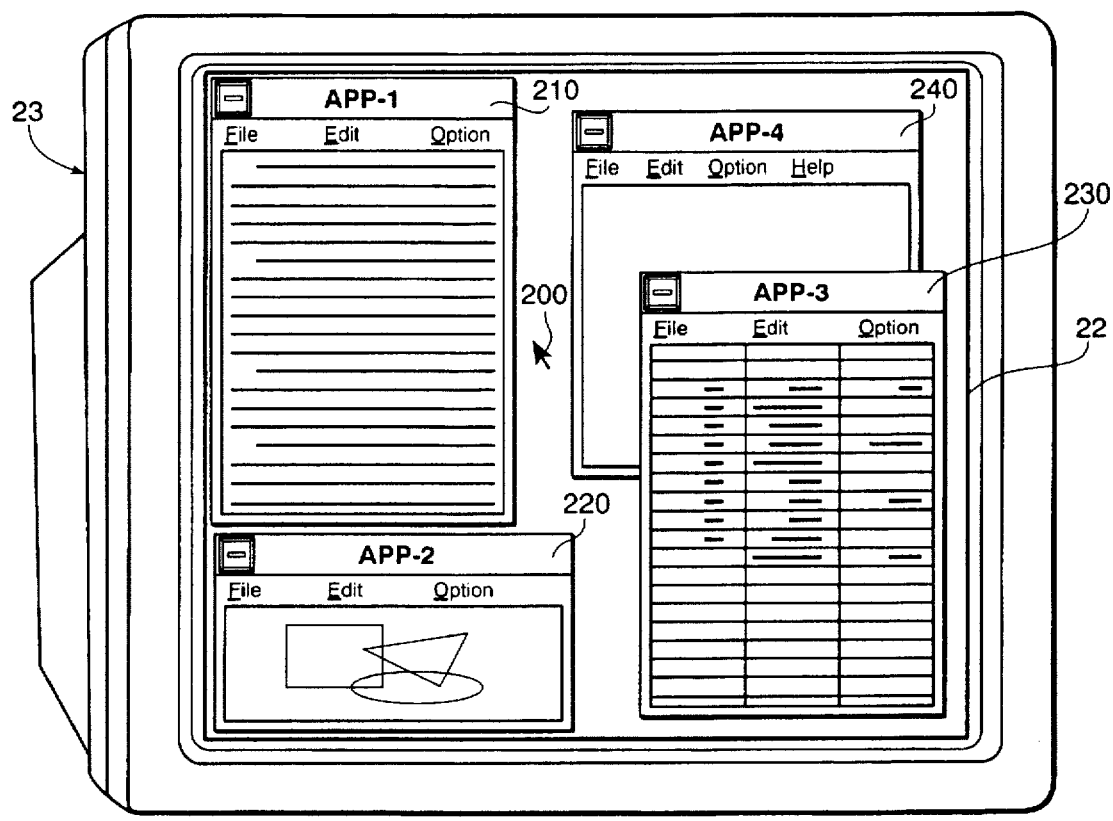
FIGS. 5 to 11(b) show one representative operation of the data transfer system using multiple memory buffers in transferring multiple data selections from two application programs to two other application programs from a user's point of view.

FIG. 5 shows display screen 22 with cursor 200 and instances of four application programs. APP-1 210 is an instance of an application with simulated text, APP-2 220 is an instance of an application with simulated graphics, APP-3 230 is an instance of an application with a simulated spreadsheet, and APP-4 240 is an instance of a general application with no data shown.

The four applications shown in FIG. 5 are illustrative of a typical multitasking situation and should not be considered limiting in any sense. In particular, the invention is operable with any kind of application program, and not necessarily with just text, spreadsheet and graphics application programs.

Cursor 200 can be used to bring any of the instances of the applications into focus, to select and manipulate data, and to select commands and options from pull-down menus. In addition, key stroke combinations can be used to perform some or all of these functions. Cursor 200 can be controlled by the user through pointing device 27 or by some other means (e.g., key strokes, voice recognition, a touch screen, a light pen, etc.).

Figure 6A:
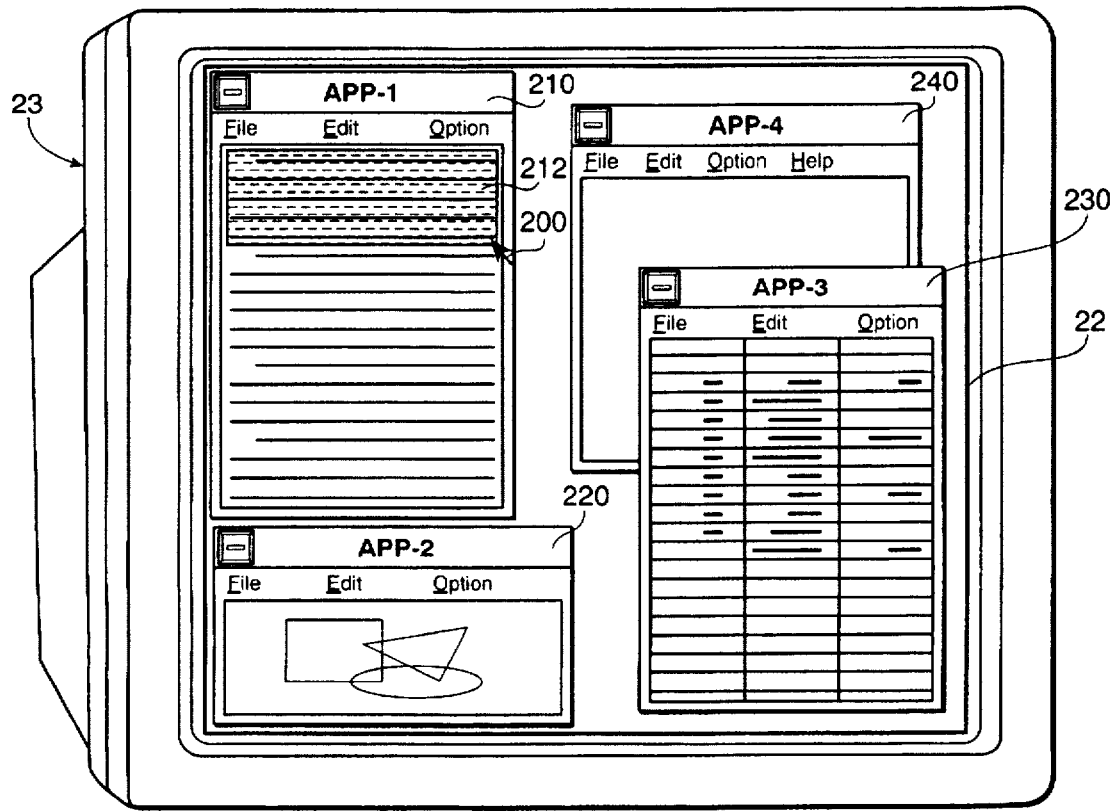
Figure 6B:
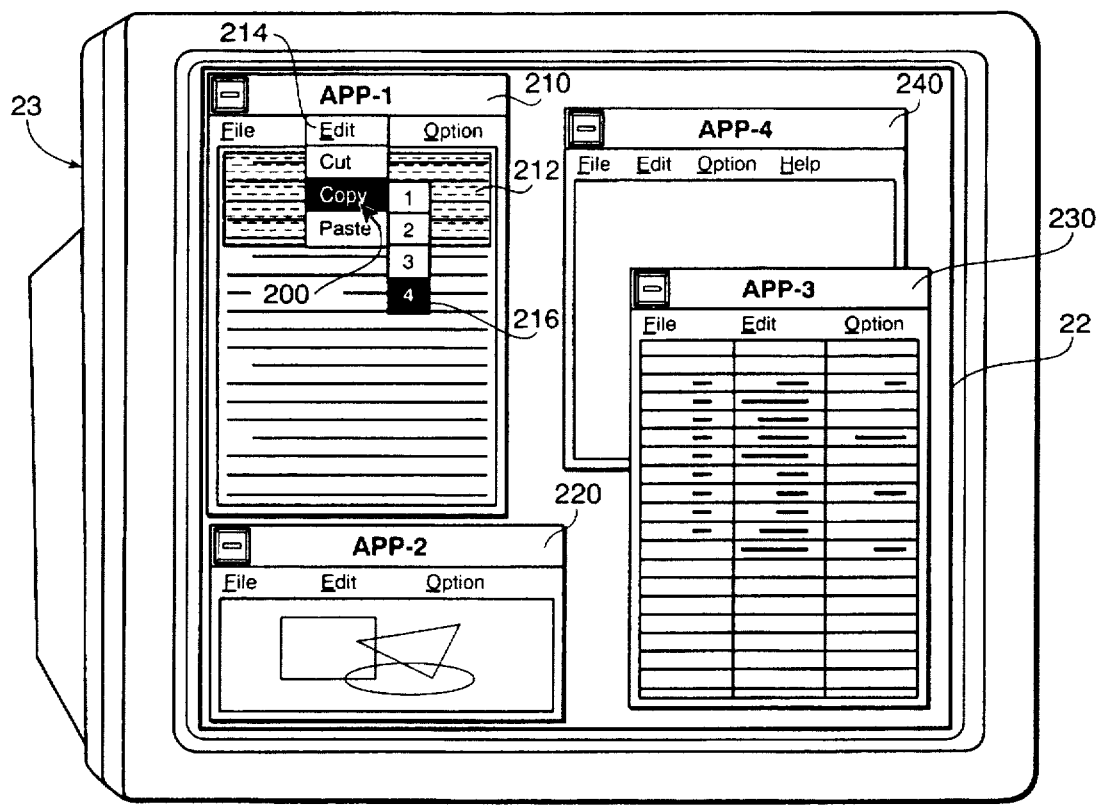
Figure 6C:
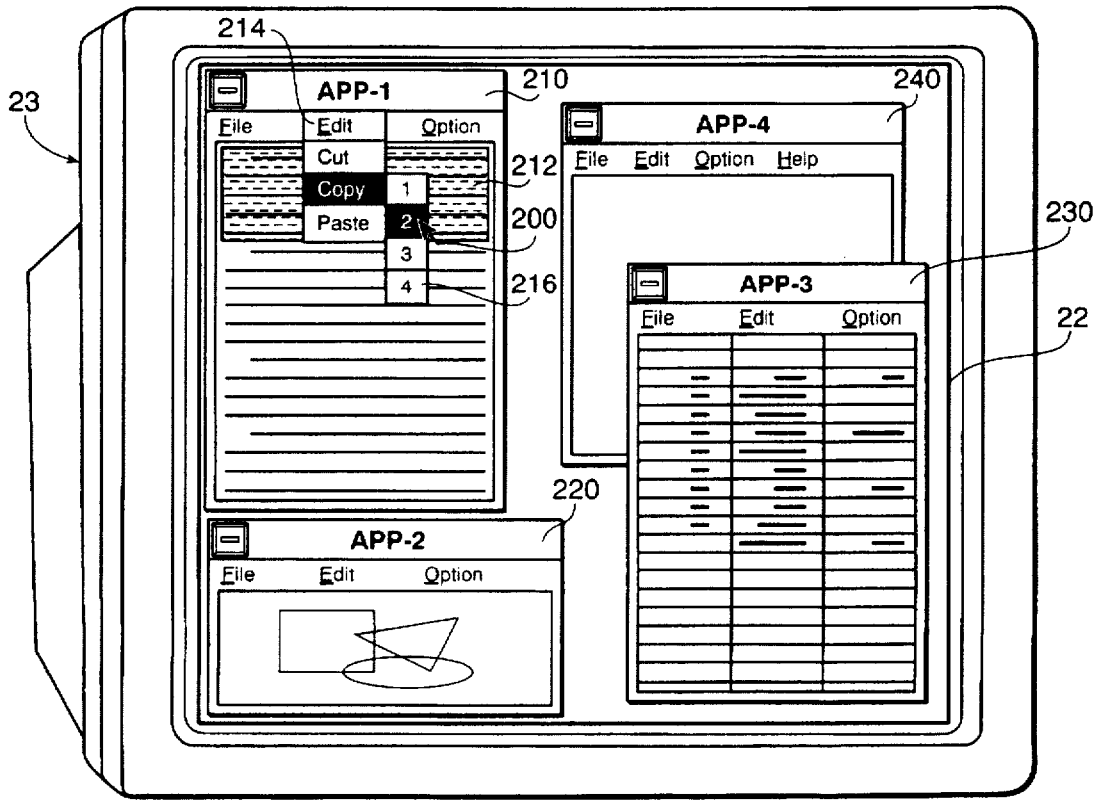

In FIG. 6(a), the user brings APP-1 210 into focus and makes a first text data selection 212. In FIG. 6(b), the user manipulates edit pull-down menu 214 to select a "copy" operation. Selecting the "copy" operation (or the "cut" operation) automatically brings up another menu 216, here shown as a pull-right menu but just as easily implemented with a pull-left or pop-up or other type of user interface. Menu 216 shows which of the multiple memory buffers in the clipstack are available for storing data from APP-1. Preferably, menu 216 is brought up with the next blank memory buffer pre-selected by default so as to speed the next step, which is for the user to select one of the multiple memory buffers, in a case where the user wishes to select the next blank buffer.

While still in focus in APP-1, the user can select any of the displayed memory buffers, and is not limited to the memory buffer pre-selected for him. Thus, in FIG. 6(c), without ever leaving focus from APP-1 210, the user manipulates menu 216 to select memory buffer #2. First text data selection 212 is then automatically stored into editing buffer #2 by this operation.

Preferably, if there is only one buffer active and if that buffer is blank, then data automatically is stored into the blank buffer without requiring the user to select which buffer is desired.

Figure 6D:
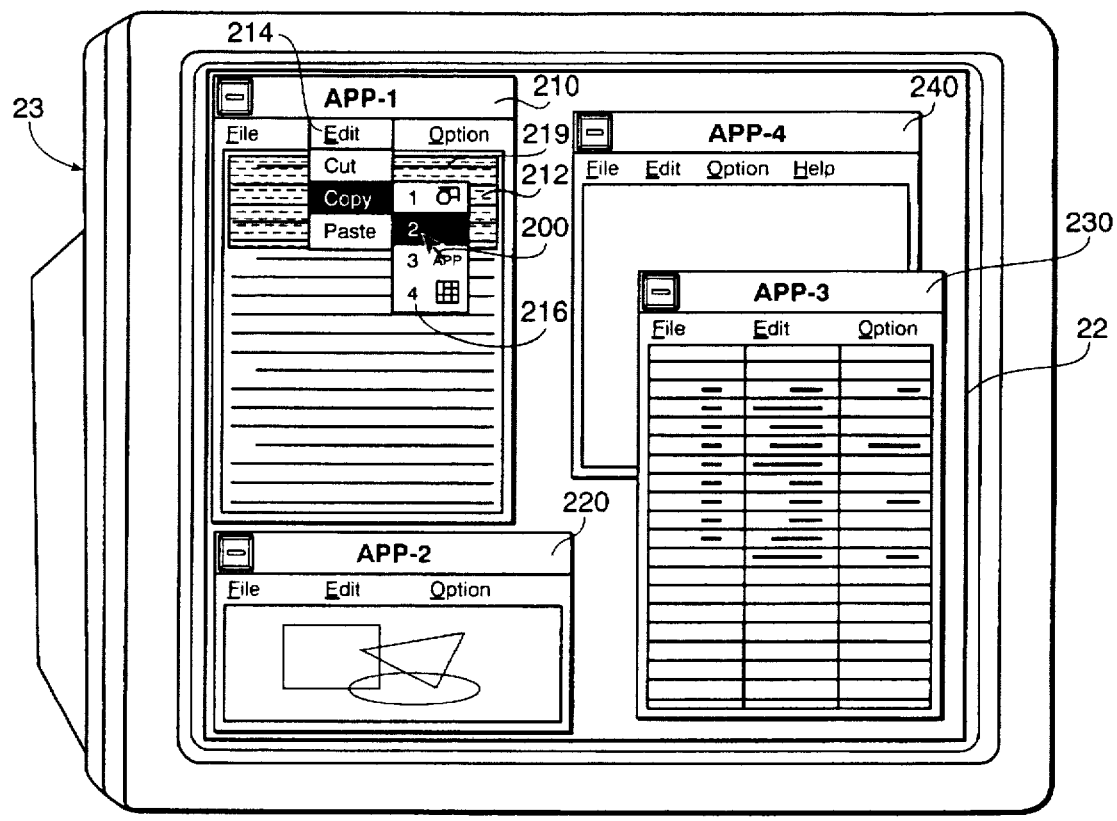

FIG. 6(d) shows an alternate form of pull-right menu 216, in which indicators 219 show the type of data contained in each of the memory buffers. Indicators 219 can be text, icons, thumbnails, or any other type of symbols that indicates the contents of the memory buffers. If the buffer is empty, then indicator 219 would be blank.

The "copy" operation and the buffer can be selected at the same time, for example, by a key stroke combination which may be user-customizable and/or pre-defined. Thus, a user can press the "Ctrl," "C," and "2" keys in combination to copy the selected data into memory buffer #2. Alternatively, if pointing device 27 is a mouse with multiple buttons, then the buffer can be selected by reference to which mouse button is used with edit pull-down menu 214. For example, buffer #1 can be selected by using the left mouse button to select "copy" buffer #2 can be selected by using the center mouse button, and buffer #3 can be selected by using the right mouse button. Other means, such as voice recognition and touch screens, can also be used to select the "copy" operation and the buffer simultaneously.

Preferably, all the above operations are a default mode of operation which can be overridden by user-customization.

Figure 7A:
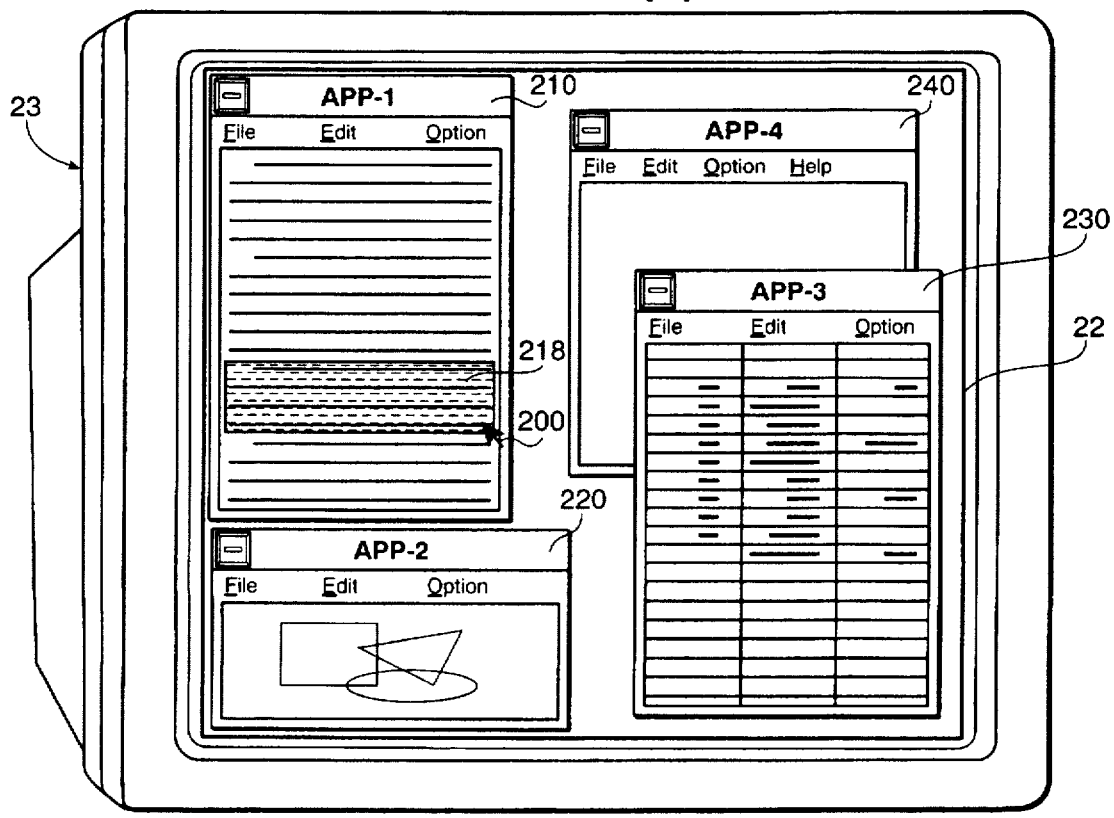
Figure 7B:
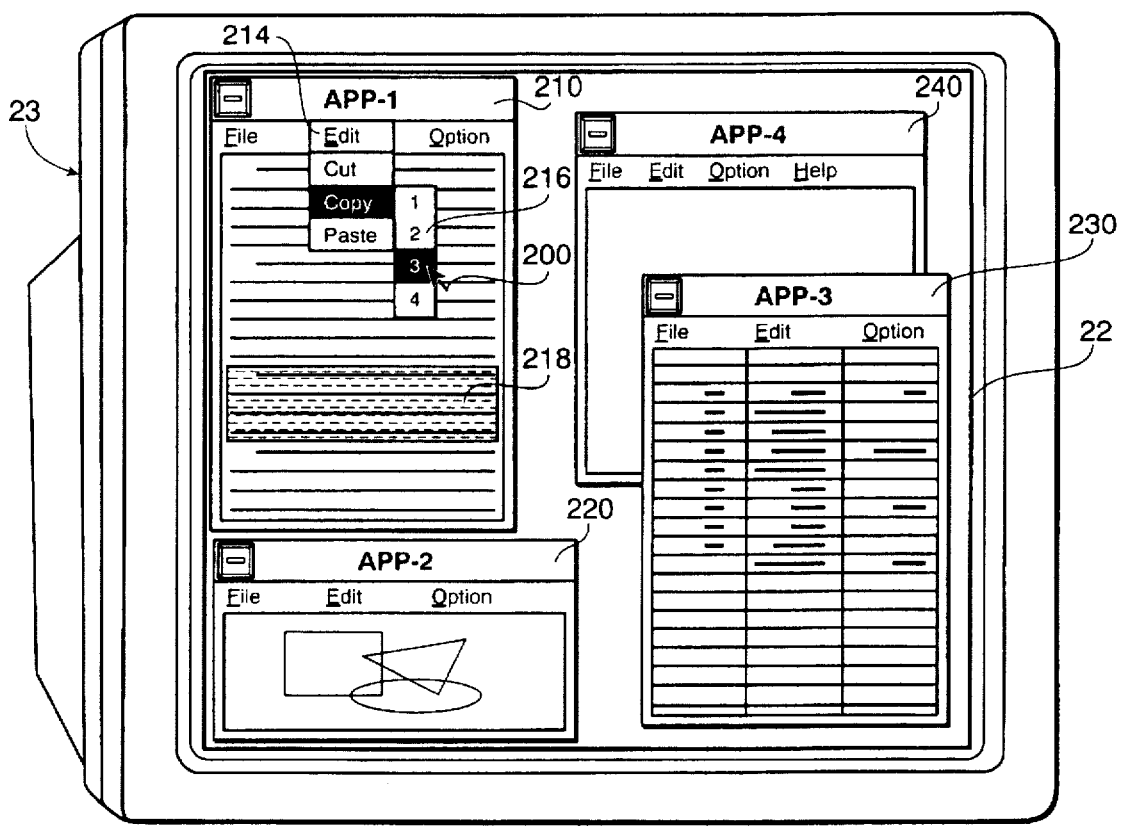

In FIG. 7(a), second text data selection 218 is selected. In FIG. 7(b), edit pull-down menu 214 and editing buffer pull-right menu 216 are used to copy second text data selection 218 into editing buffer #3.

Note that two text data selections are copied into two different editing buffers in the above operations while in focus in application APP-1 210. While it is certainly possible to leave focus in the application between these operations, the ability to copy multiple data selections into multiple memory buffers without ever leaving focus from a single application is a distinct advantage over conventional systems.

Figure 8A:
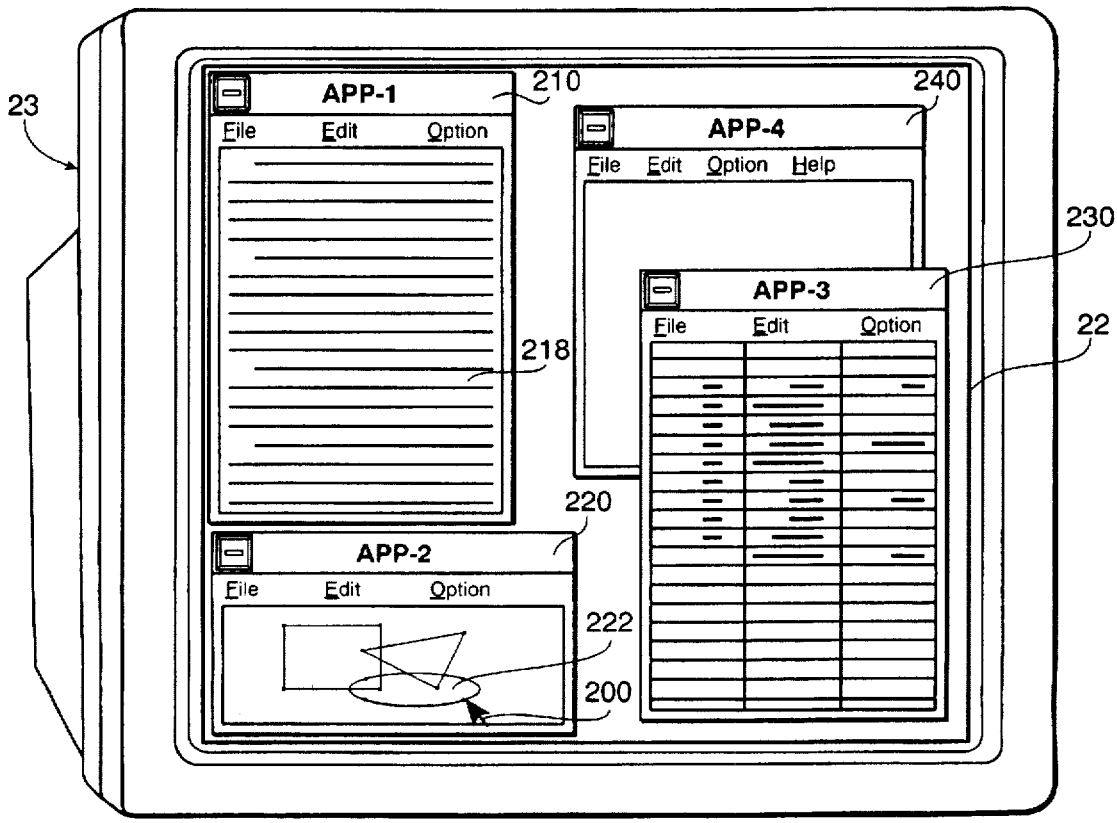
Figure 8B:
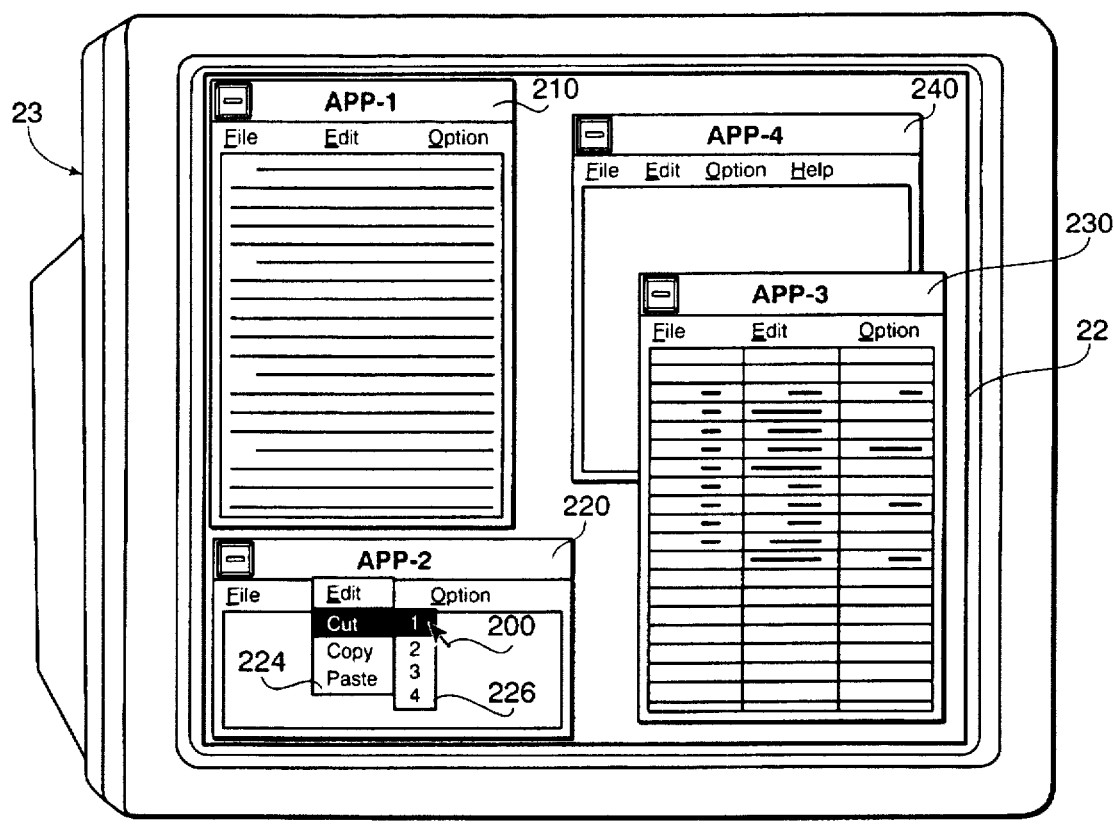

In FIG. 8(a), APP-2 220 is brought into focus and graphic data selection 222 is selected. In FIG. 8(b), graphic data selection 222 is "cut" into memory buffer #1 by use of edit pull-down menu 224 and memory buffer pull-right menu 226. Because a "cut" rather than a "copy" operation is selected, graphic data 222 is deleted from APP-2 220.

Figure 9A:
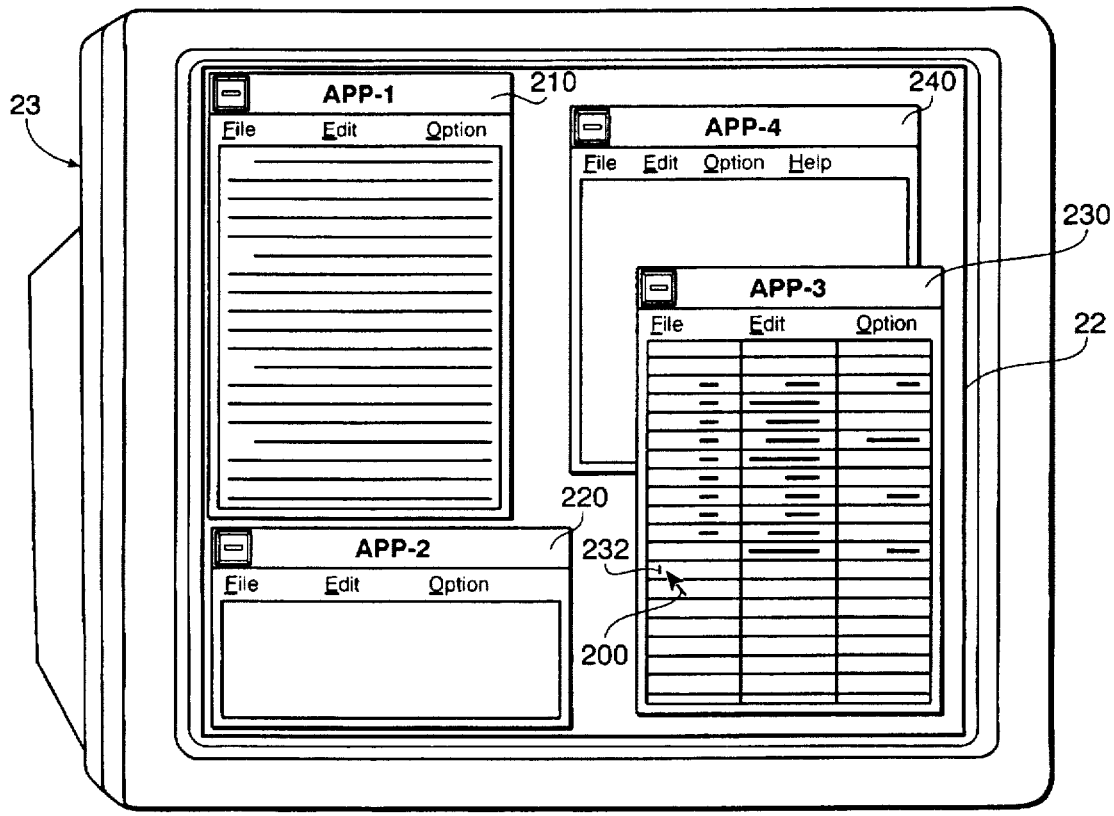
Figure 9B:
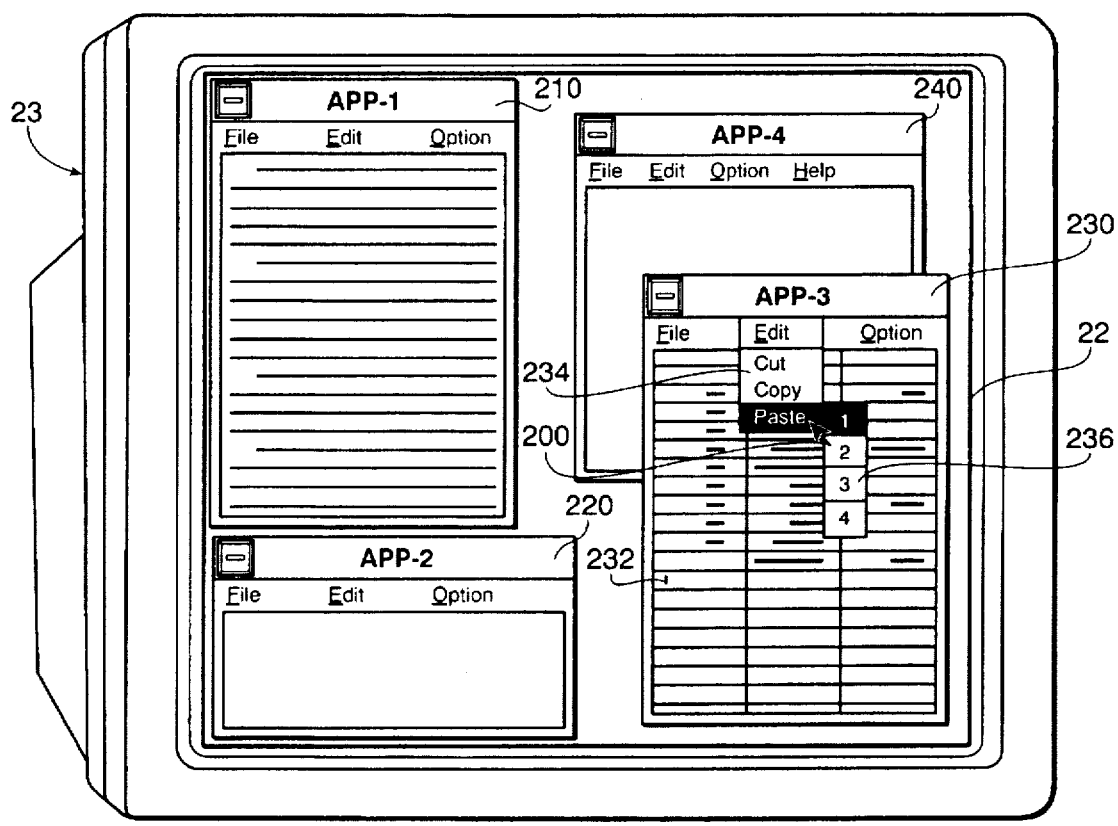
Figure 9C:
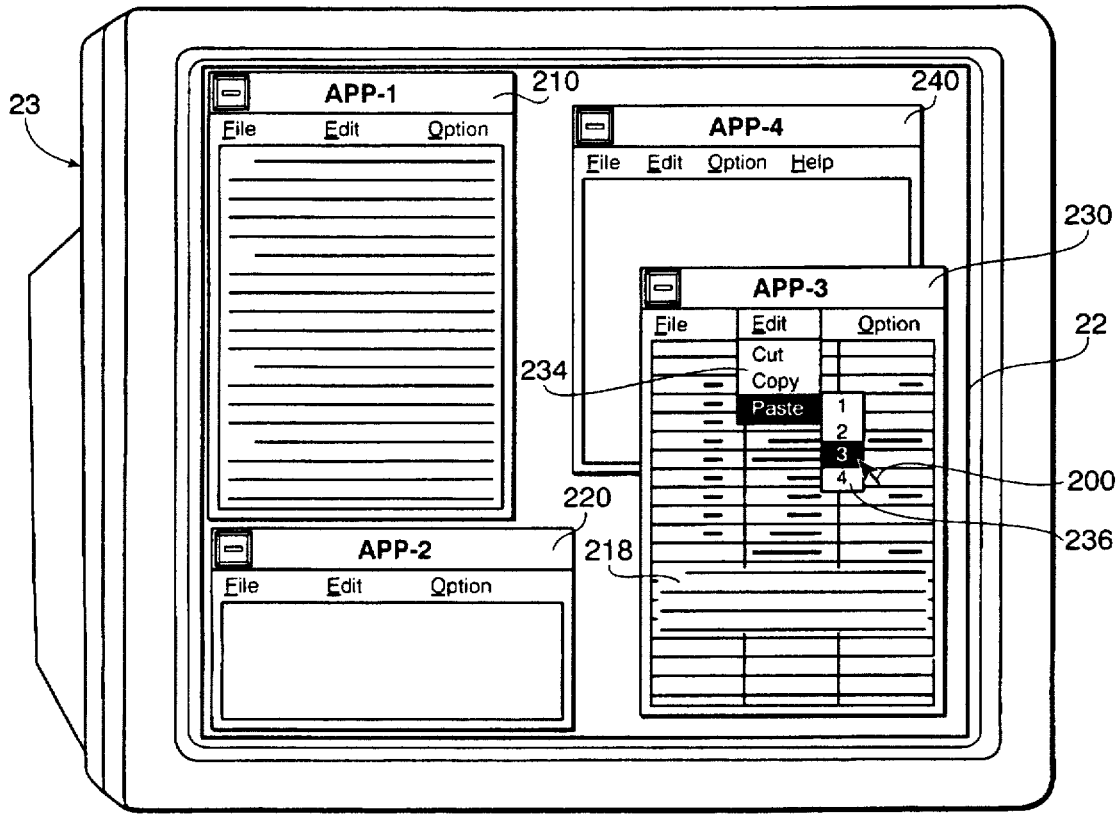

In FIG. 9(a), the user brings APP-3 230 into focus and selects position 232. In FIG. 9(b), the user manipulates edit pull-down menu 234 so as to select a "paste" operation. Selecting the "paste" operation automatically brings up another menu 236, here shown as a pull-right menu but just as easily implemented as some other type of user interface, which shows which of the multiple memory buffers in the copystack are available to recall data from. Preferably, menu 236 is brought up with the last buffer into which data was stored preselected by default so as to speed the next step, which is for the user to select one of the buffers, in a case where the user wishes to recall the last data stored.

While still in focus in APP-3, the user can select any of the displayed memory buffers, and is not limited to the buffer pre-selected for him. Thus, in FIG. 9(c), while still in focus in APP-3 230, the user manipulates menu 236 so as to select memory buffer #3. As a result, second text data selection 218, which is stored in memory buffer #3, is recalled from memory buffer #3 and "pasted" into the designated position in APP-3 230.

As with the "cut" and "copy" operations, the "paste" operation and the buffer can be selected at the same time, for example, with a pre-designated or user-customizable keystroke combination such as "control", "V" and "3", or with particular mouse buttons, or the like.

It should be noted that if there is only one memory buffer with data in it (i.e., all other buffers are blank), then selection of a "paste" operation preferably will automatically select that non-blank buffer and "paste" data from it without the need for further instructions from the user.

Again, it is preferred for the above operations to be user-customizable so as to override default modes of operation.

Figure 10A:
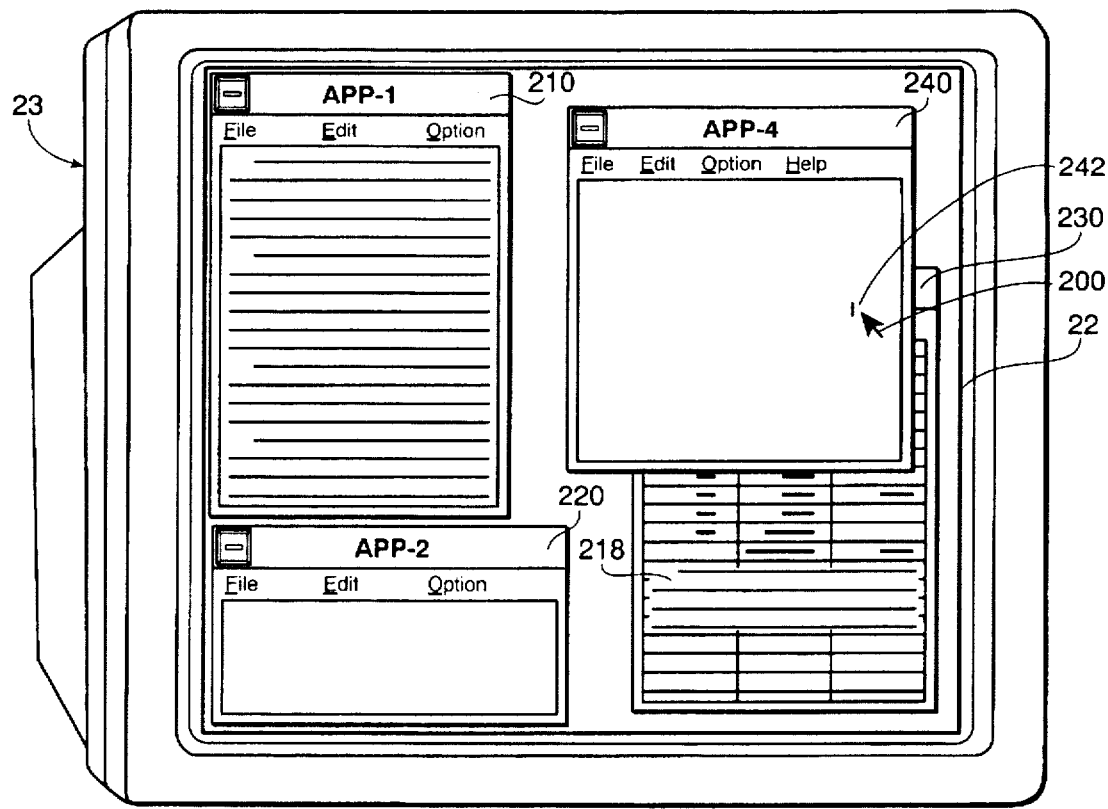
Figure 10B:
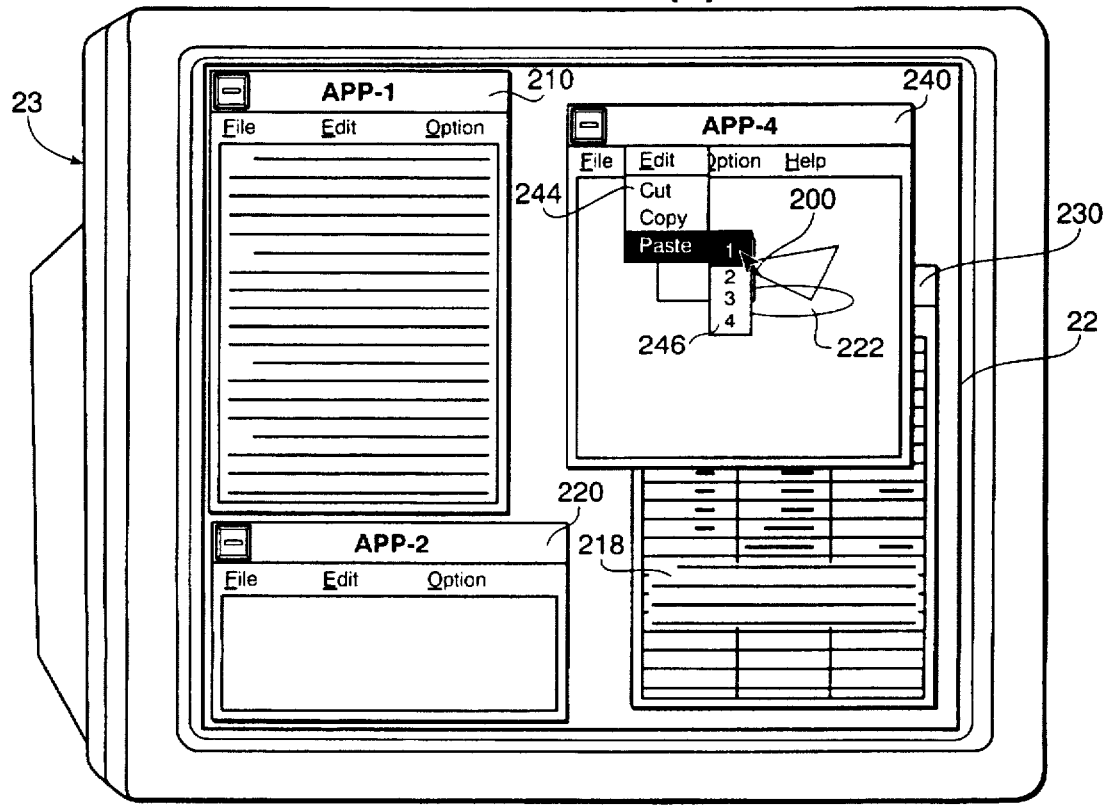

In FIG. 10(a), APP-4 240 is brought into focus and position 242 is selected. In FIG. 10(b), a "paste" operation is selected with edit pull-down menu 244 and memory buffer #1 is selected with pull-right menu 246. As a result, first graphic data selection 222 is pasted into APP-4 240.

Figure 11A:
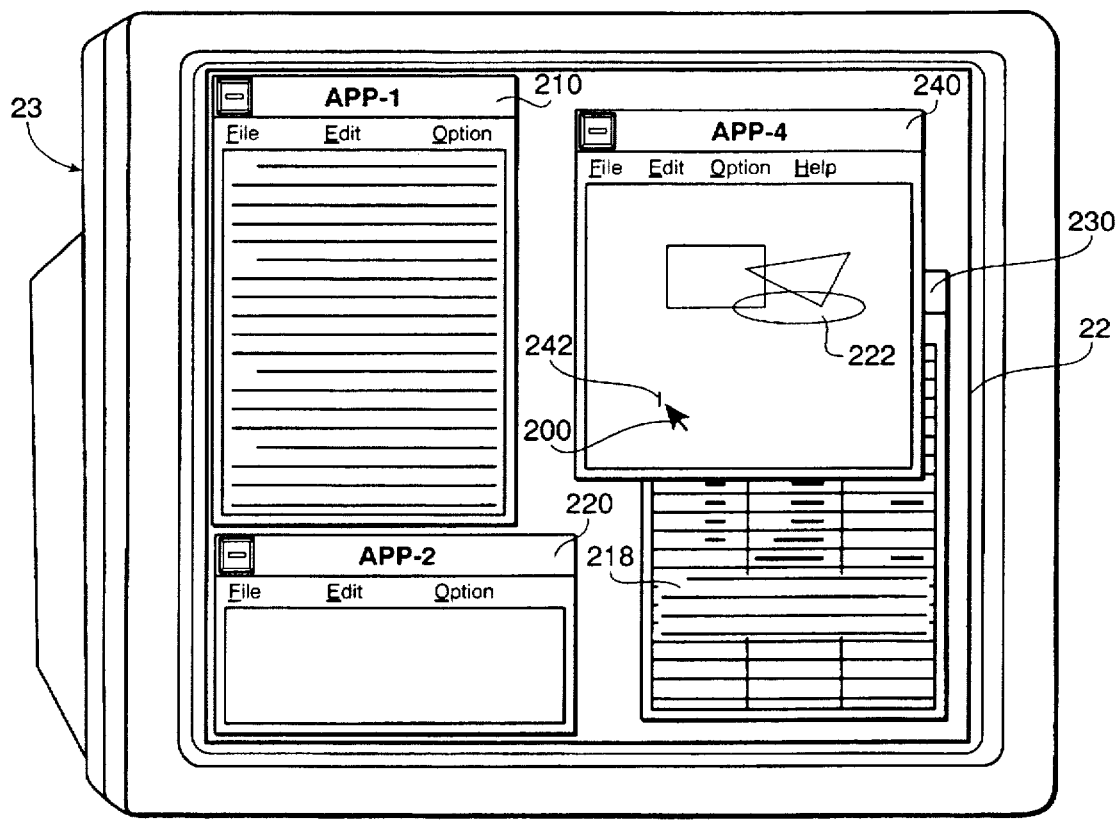
Figure 11B:
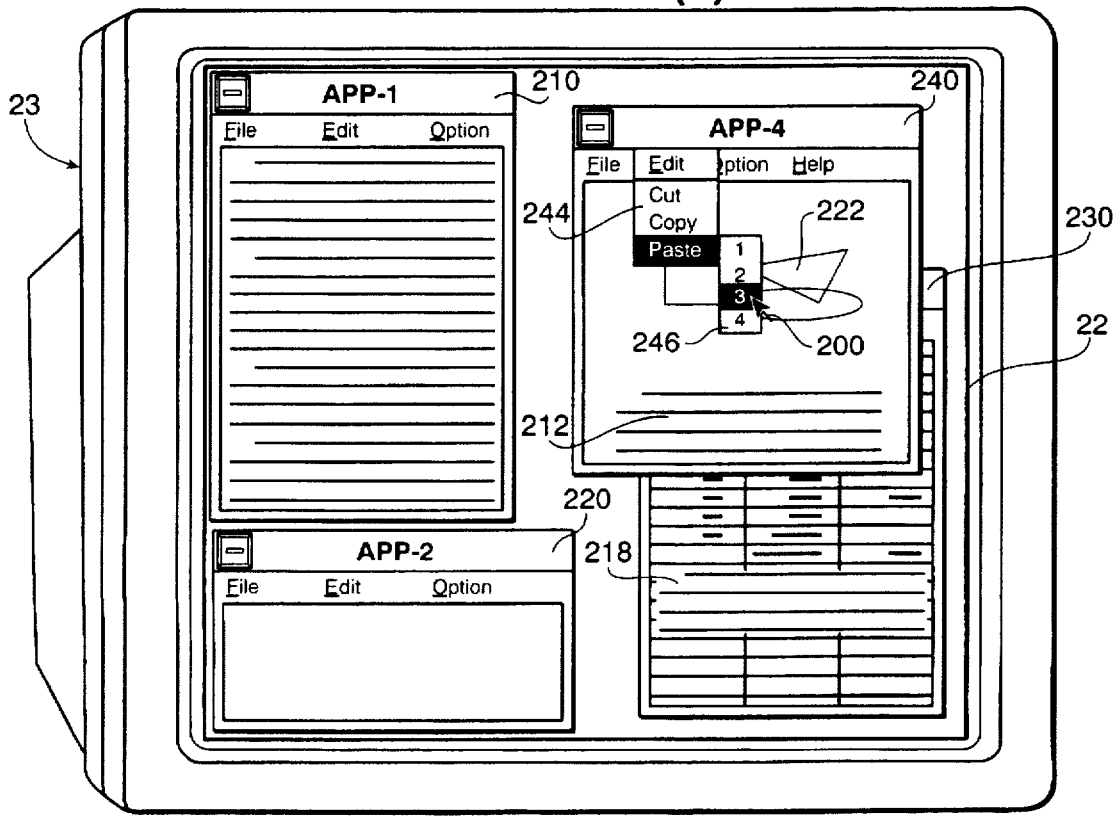

In FIG. 11(a), position 242 is selected at a new position in APP-4 240. In FIG. 11(b), the "paste" operation is selected with edit pull-down menu 244 and buffer #2 is selected with memory buffer menu 246. As a result, first text data selection 212 is "pasted" into APP-4 240 at position 242.

In the above "pasting" operations, multiple memory buffers are accessed while still in focus in a single application window. While the memory buffers certainly can be accessed from within different application windows, the ability to "paste" data from multiple memory buffers without ever leaving focus from a single application window is a great advantage over conventional systems.

Figure 12A:
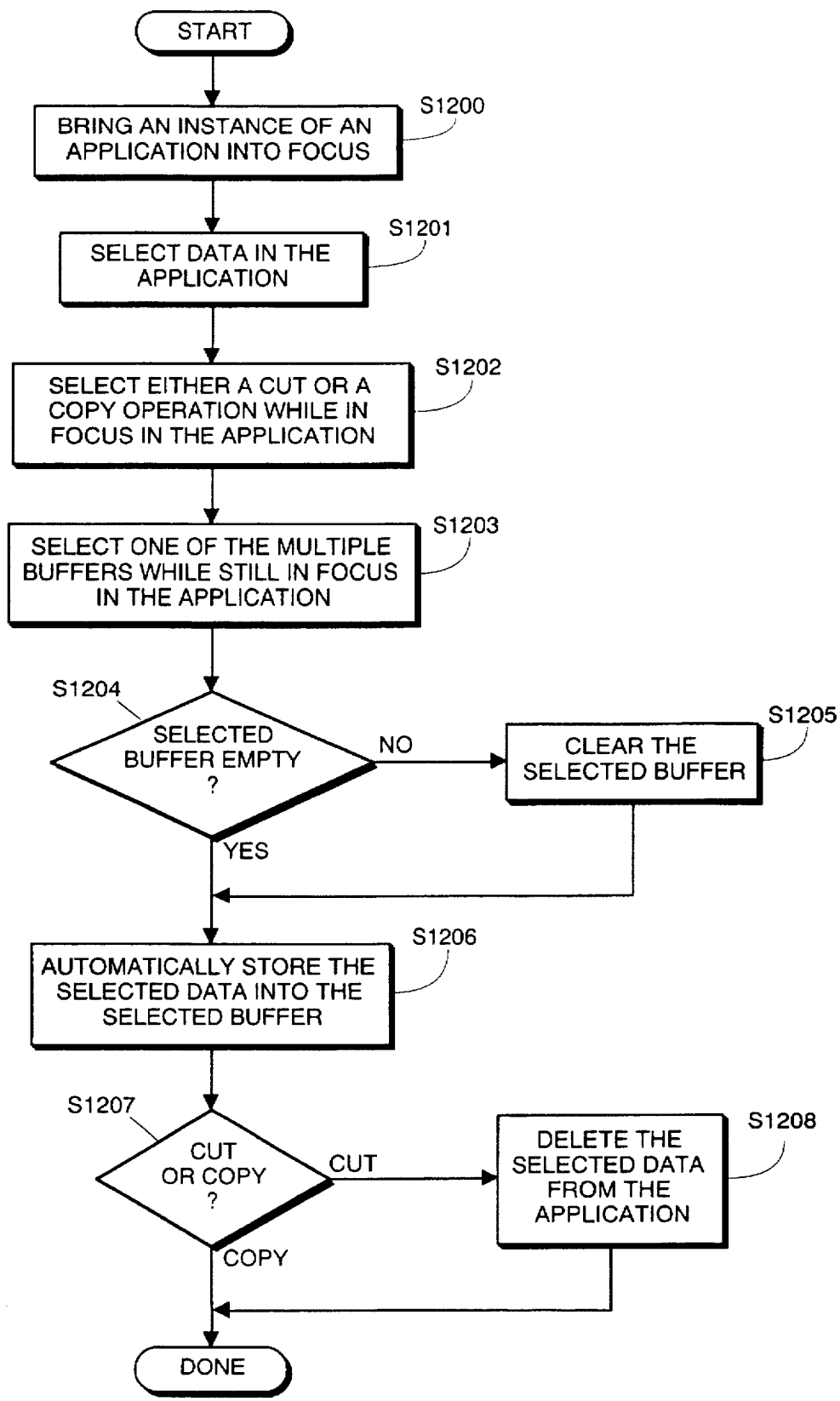
FIGS. 12(a) and 12(b) are flow charts showing. from a user's point of view. the operation of the data transfer system using multiple memory buffers to copy data from an application program to one of the memory buffers.
Figure 12B:
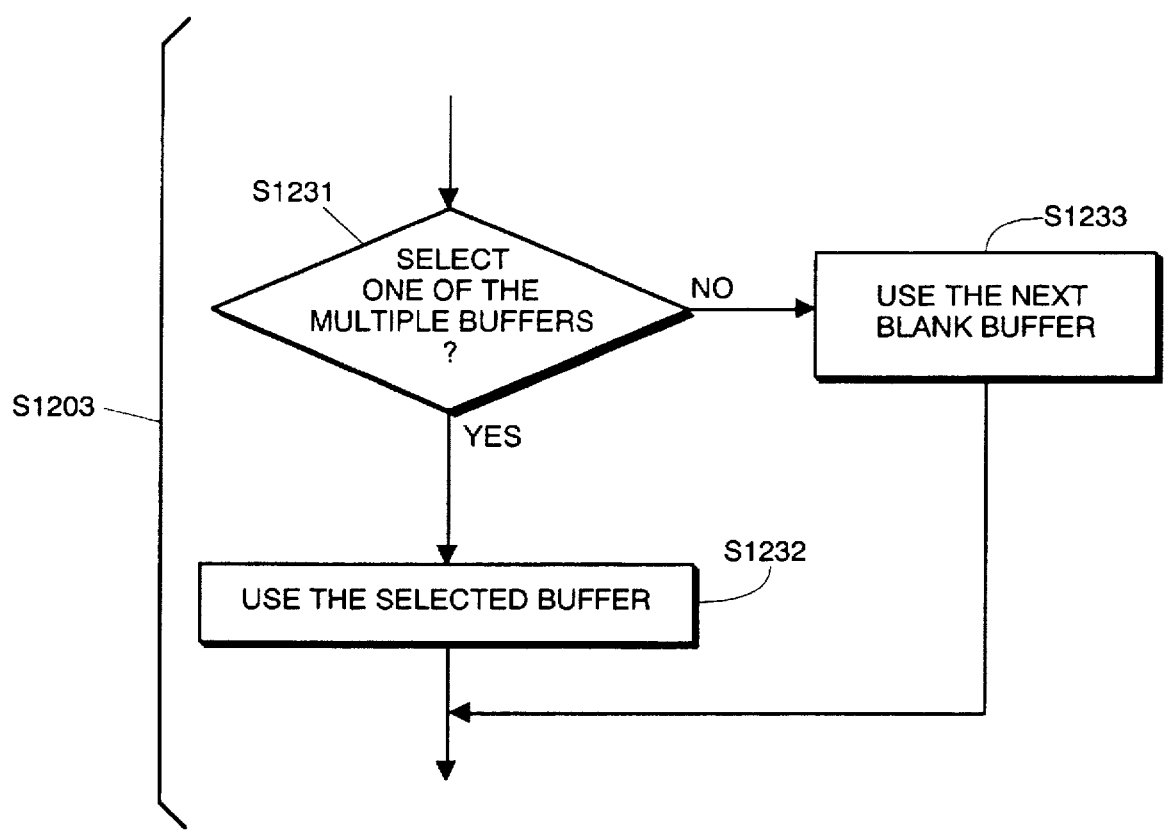

FIGS. 12(a) and 12(b) are flow charts describing the "cut" and "copy" operations illustrated above. First, in step S1200, an instance of an application is brought into focus. Then, data is selected in the application in step S1201. Either a "cut" or a "copy" operation is selected while in focus in the instance of the application in step S1202. In step S1203, one of the multiple buffers is selected while still in focus in the instance of the application. In step S1204, the application checks to see if the selected buffer is empty. If the selected buffer is not empty, step S1205 clears the selected buffer. In either case, the selected data is automatically stored into the selected buffer in step S1206. In step S1207, flow is directed to step S1208 if a "cut" operation is selected. In step S1208, the selected data is deleted from the instance of the application.

As shown in FIG. 12(b), Step S1203 can further comprise steps S1231, S1232, and S1233. S1231 determines whether or not one of the multiple buffers is explicitly selected. Step S1232 uses the selected buffer in the case one of the multiple buffers is explicitly selected. Step S1233 selects the next blank buffer if one of the multiple buffers is not explicitly selected.

Figure 13A:
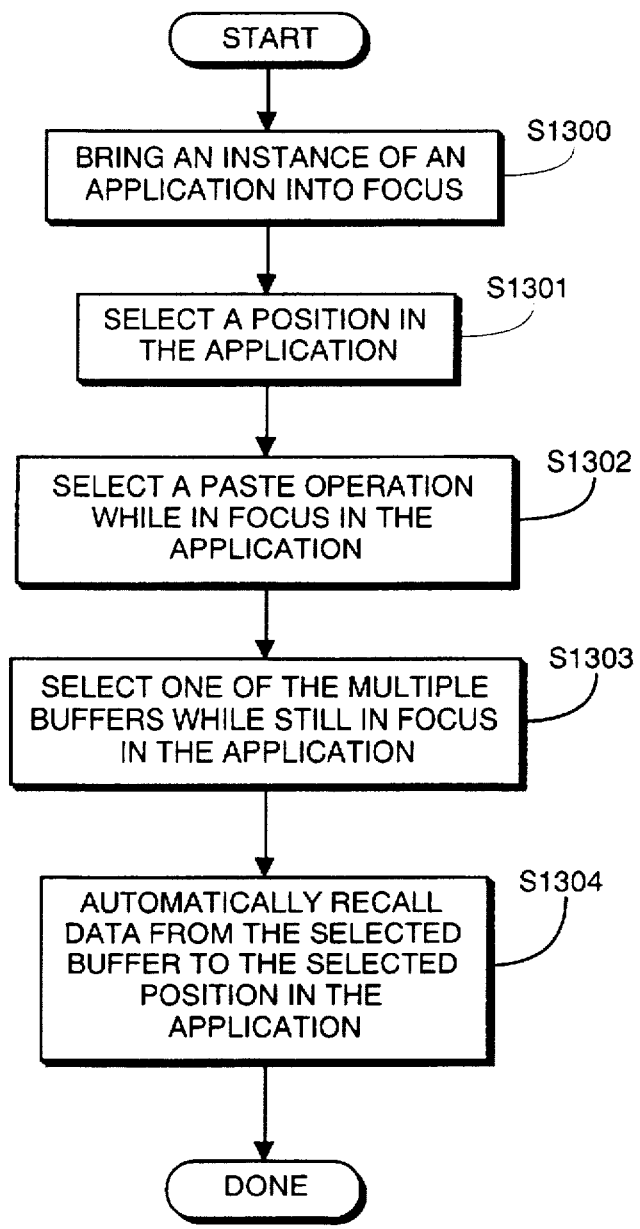
FIGS. 13(a) and 13(b) are flow charts showing the operation of the data transfer system using multiple memory buffers to copy data from one of the memory buffers to an application program. again from a user's point of view.
Figure 13B:
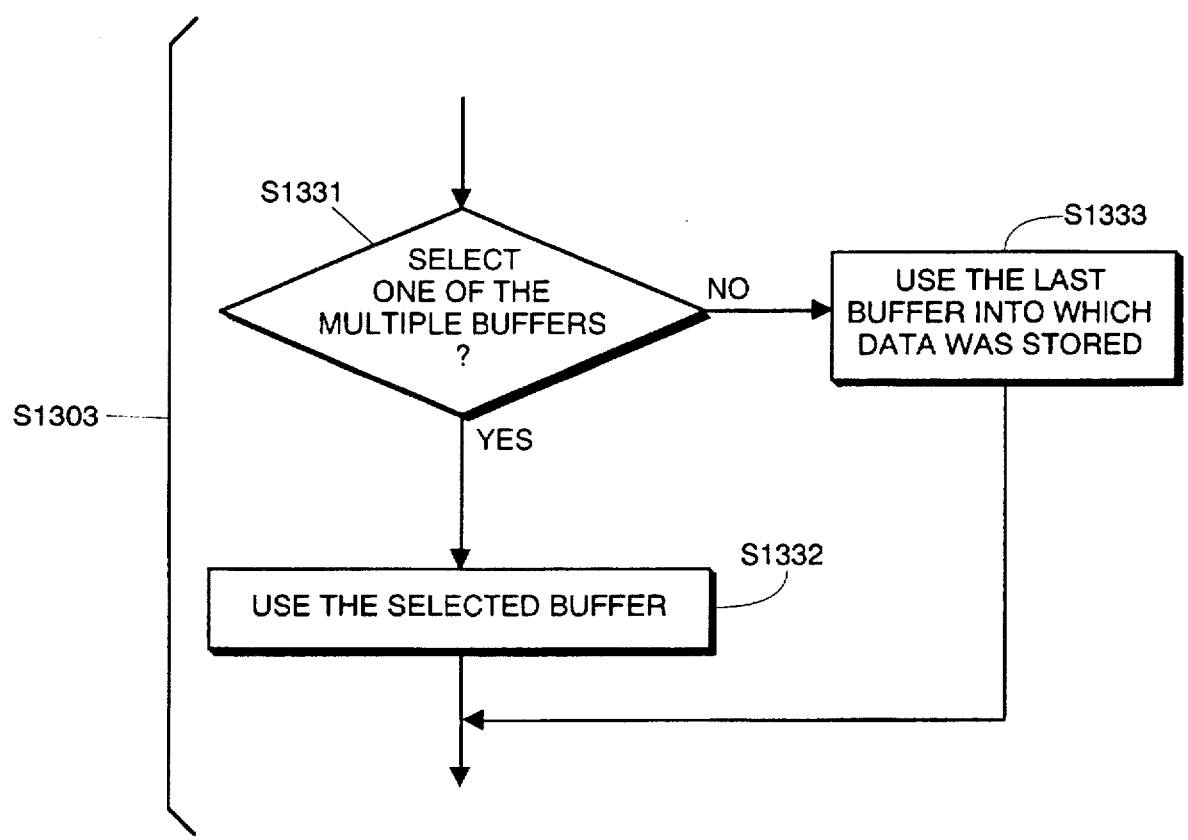
Figure 14A:
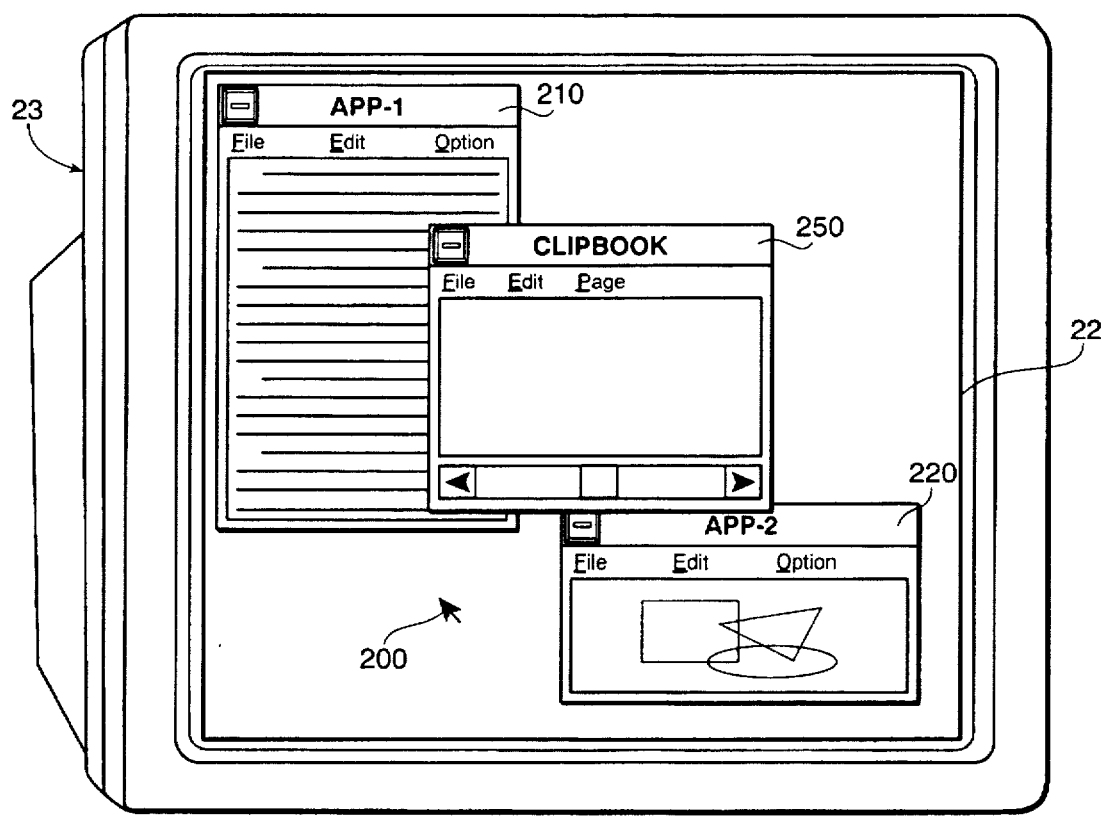
FIGS. 14(a) to 14(r) show prior art processes for transferring multiple data selections between application programs using a clipbook as a temporary storage buffer for the multiple data selections.
Figure 14B:
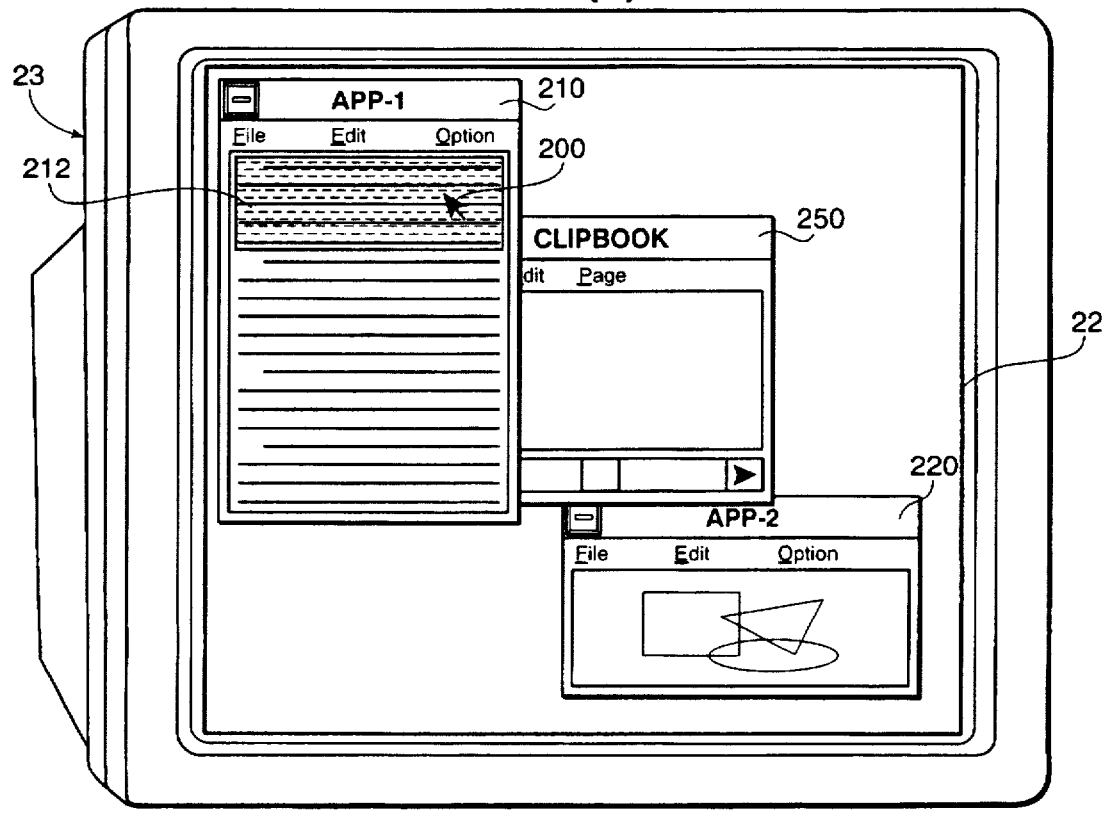
Figure 14C:
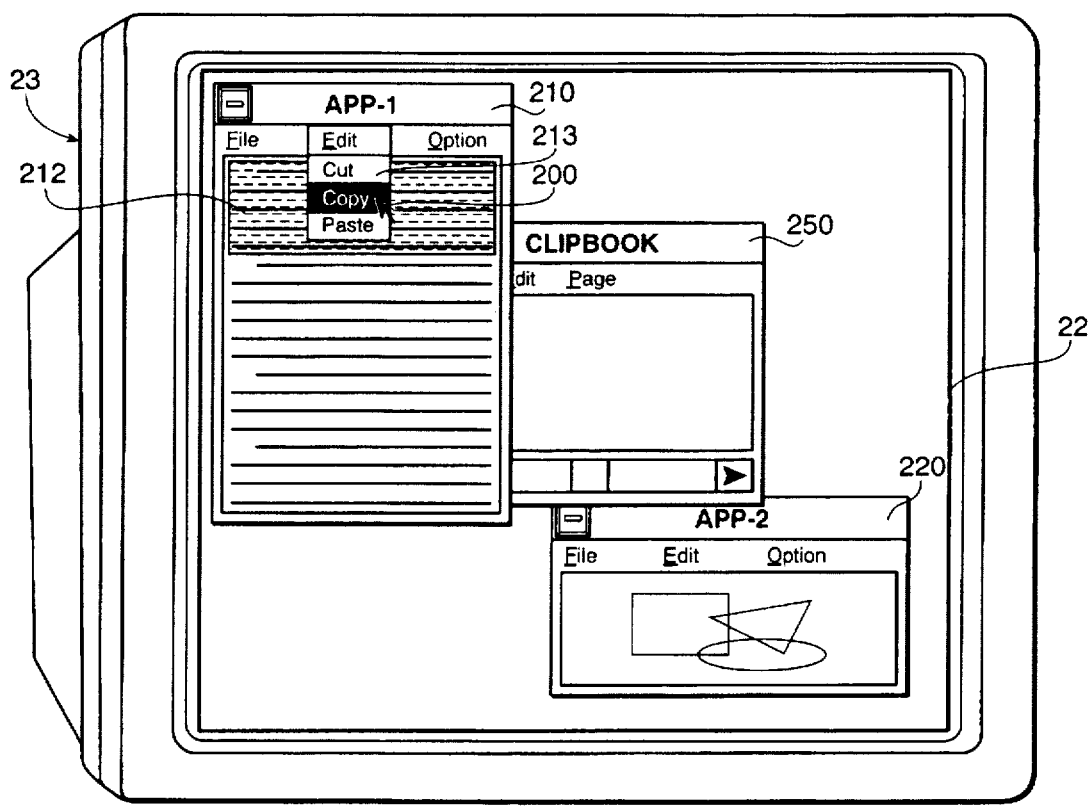
Figure 14D:
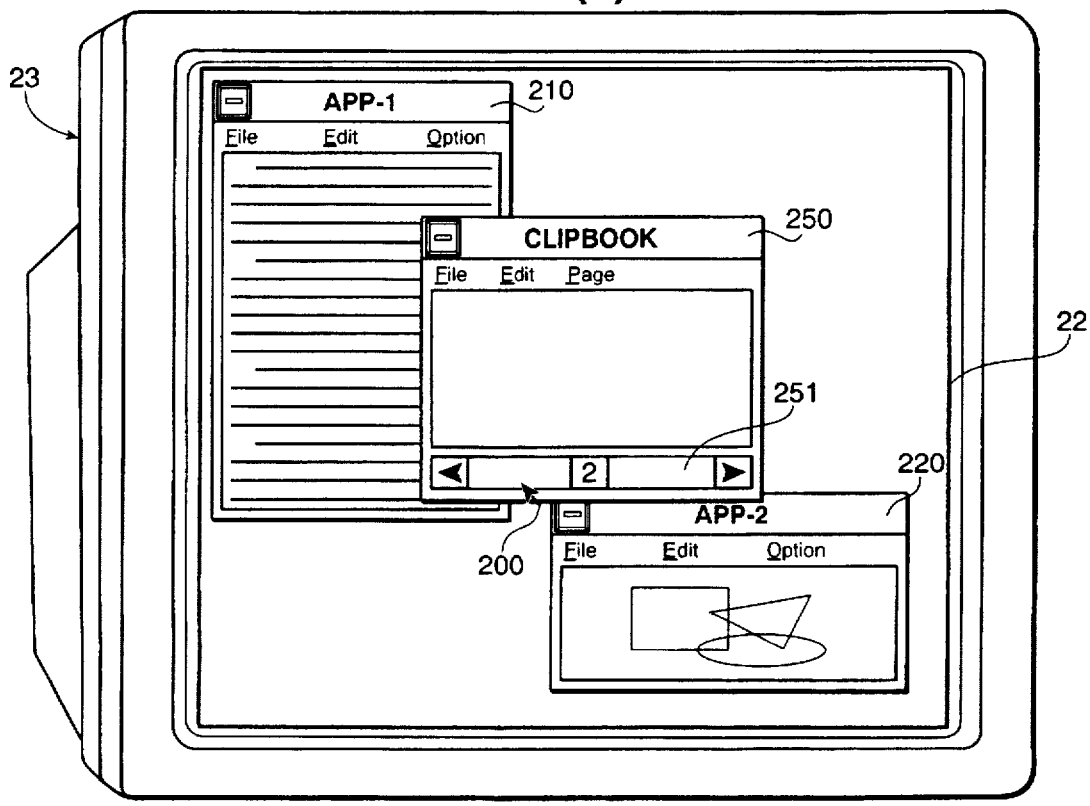
Figure 14E:
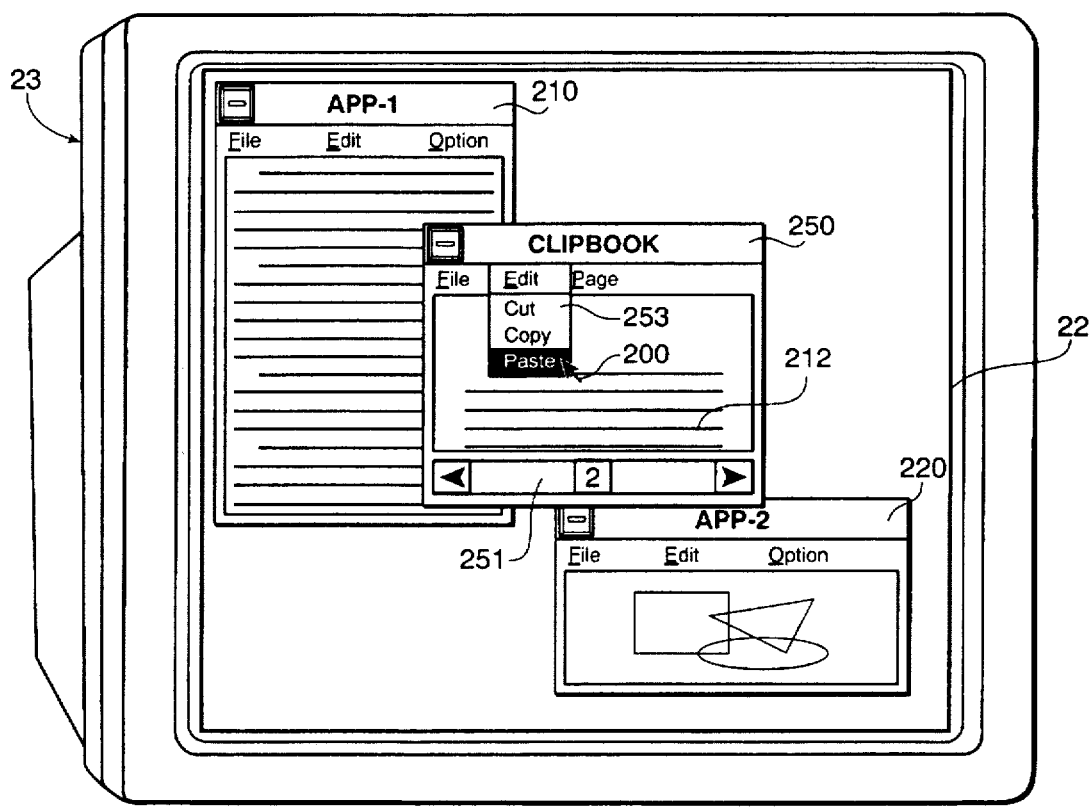
Figure 14F:
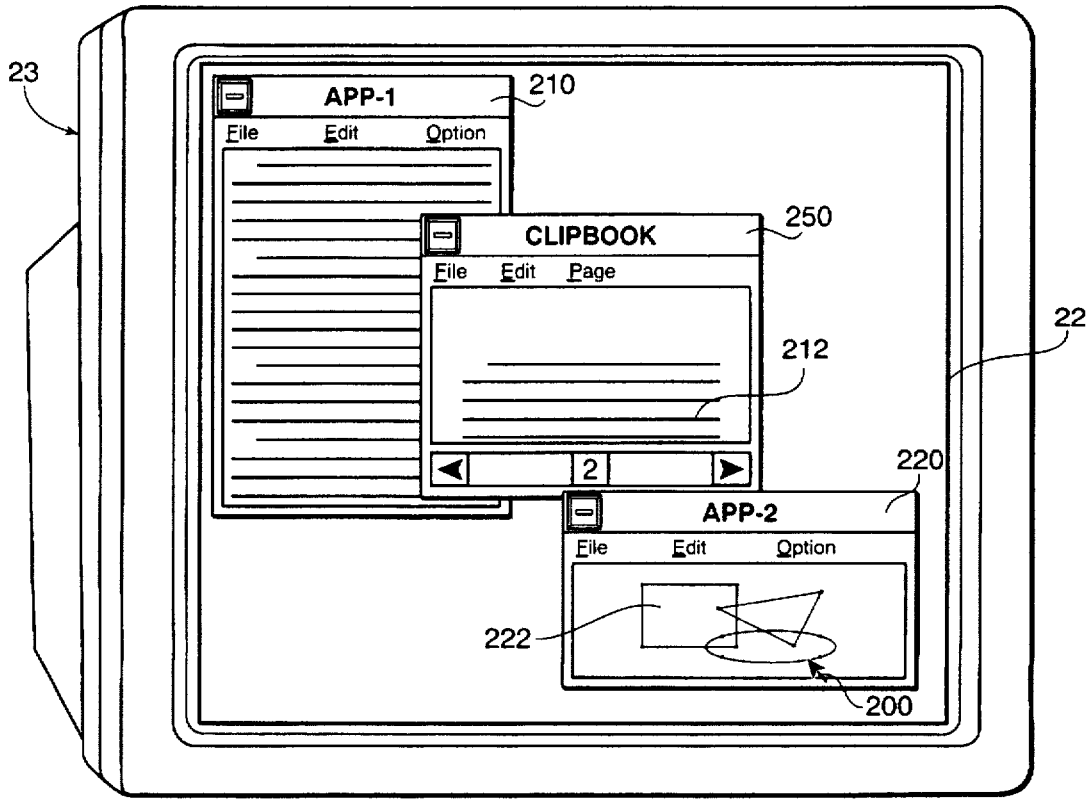
Figure 14G:
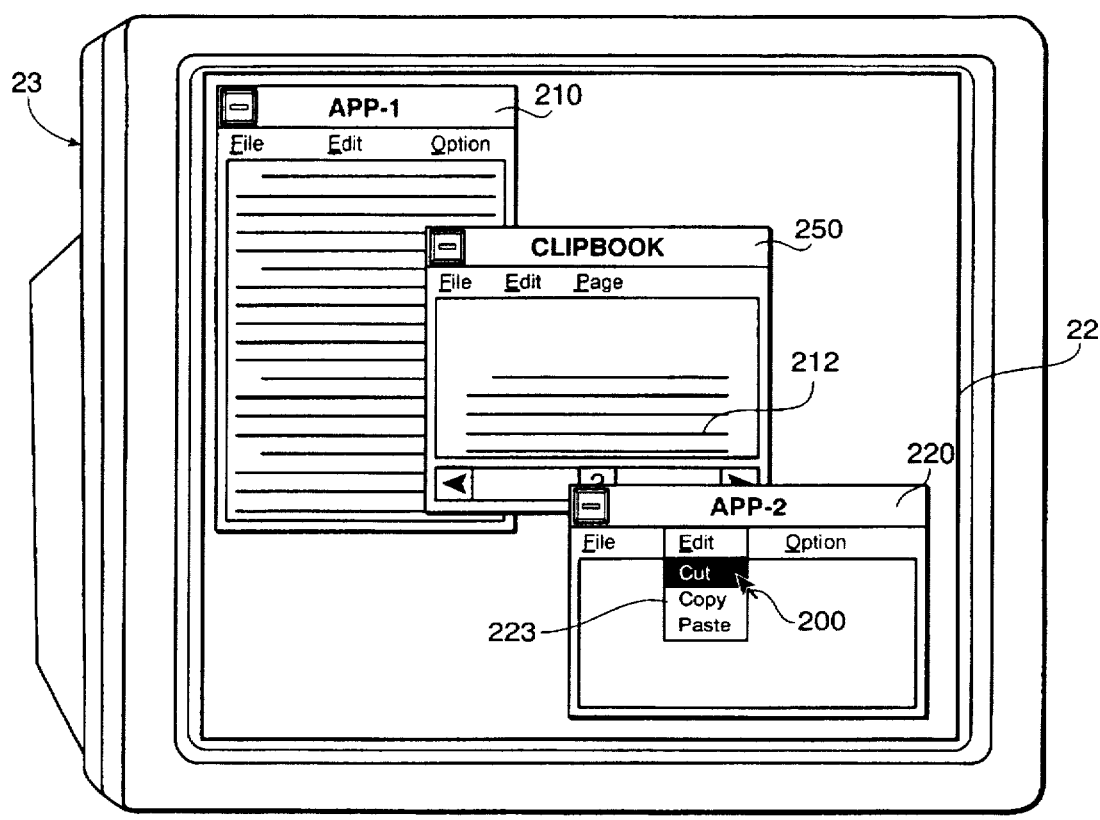
Figure 14H:
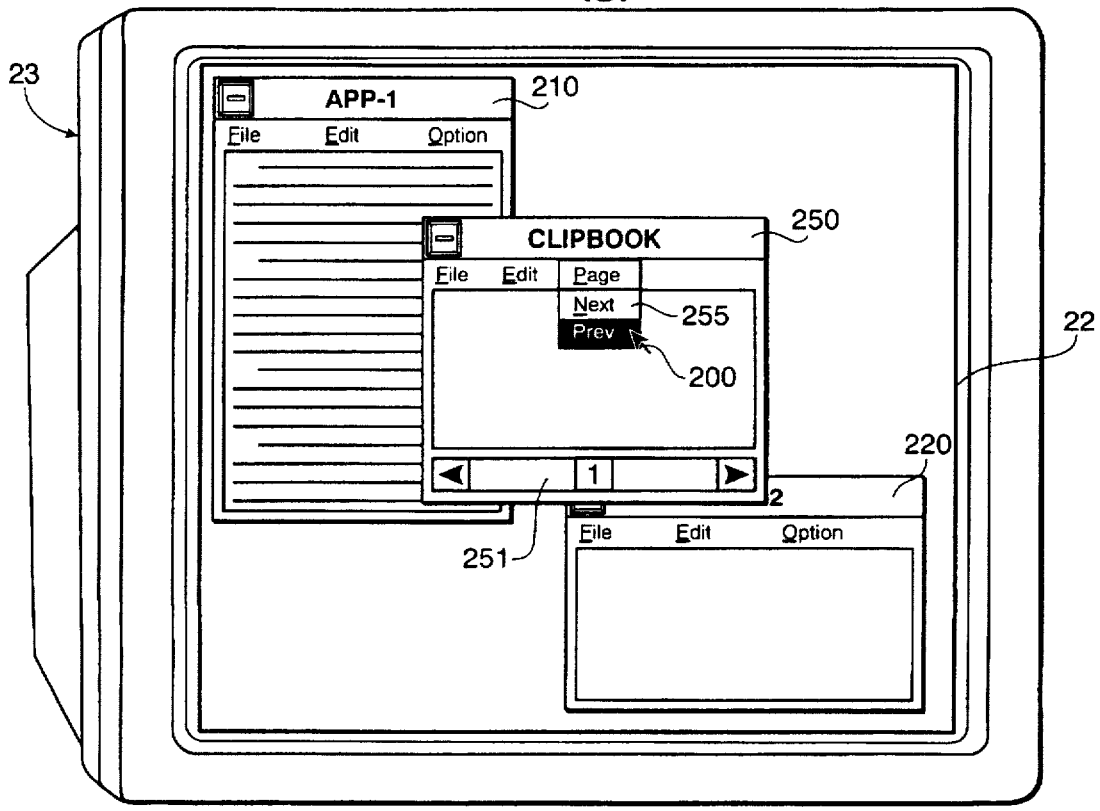
Figure 14I:
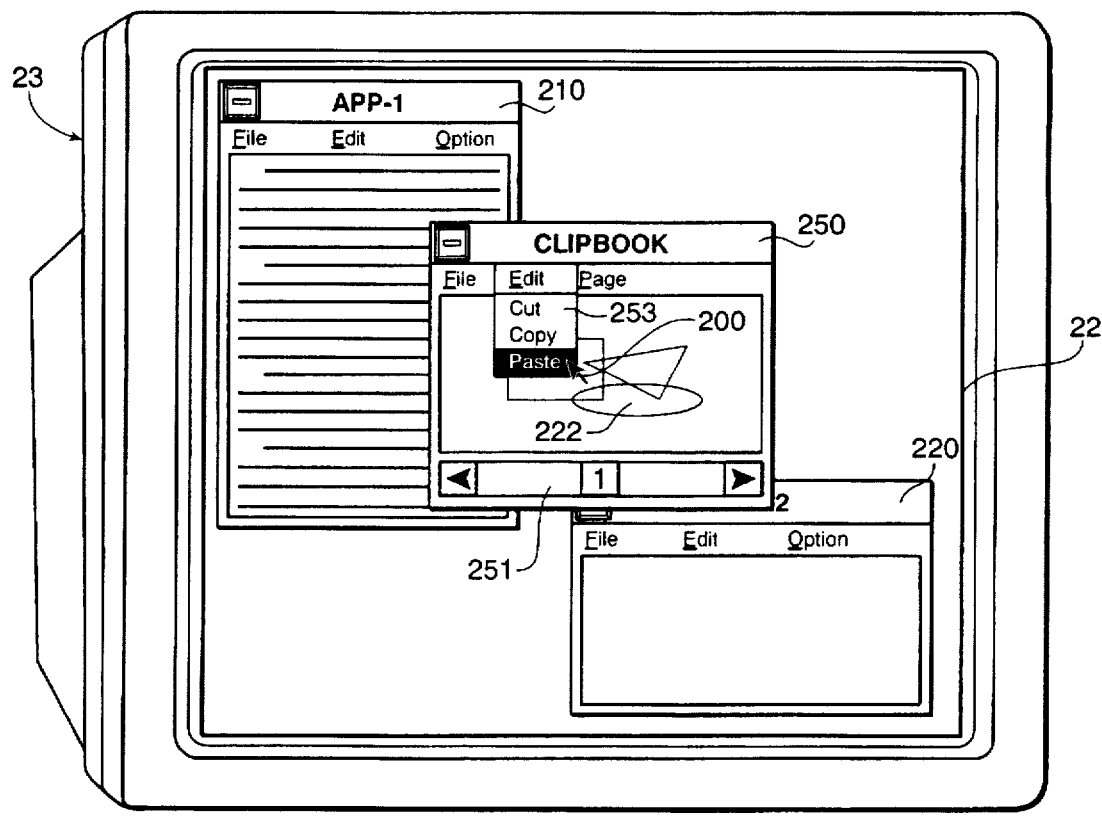
Figure 14J:
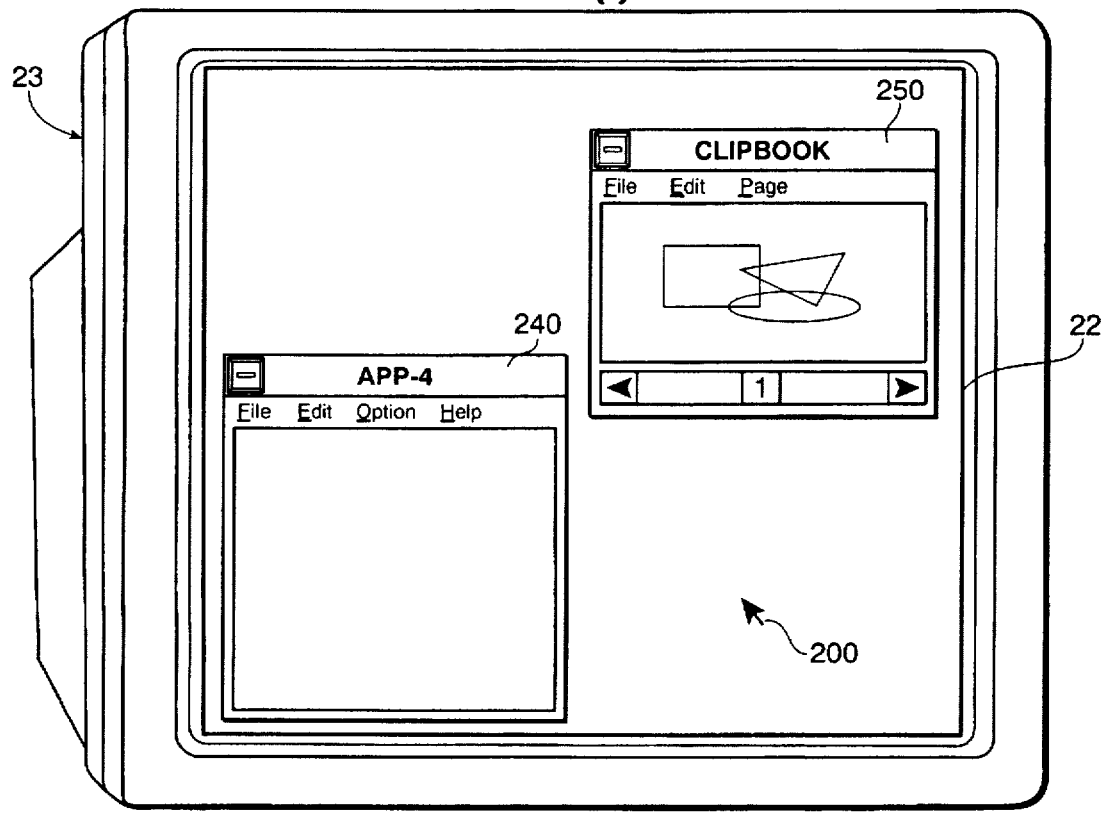
Figure 14K:
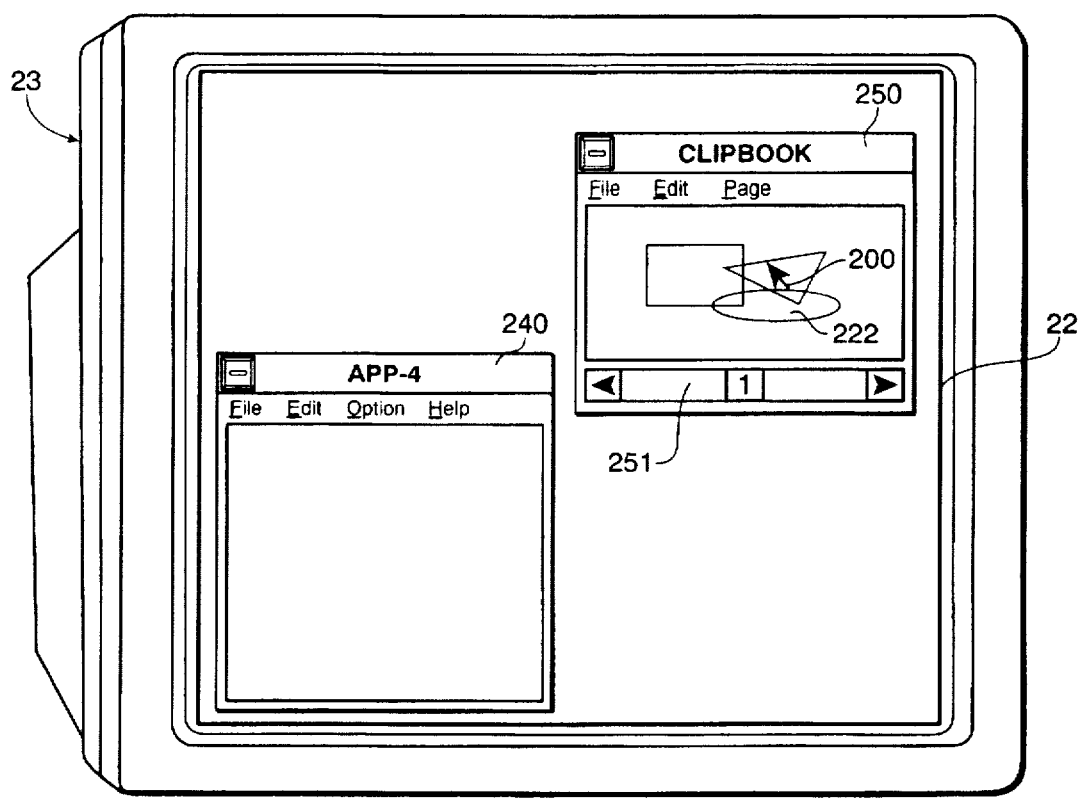
Figure 14L:
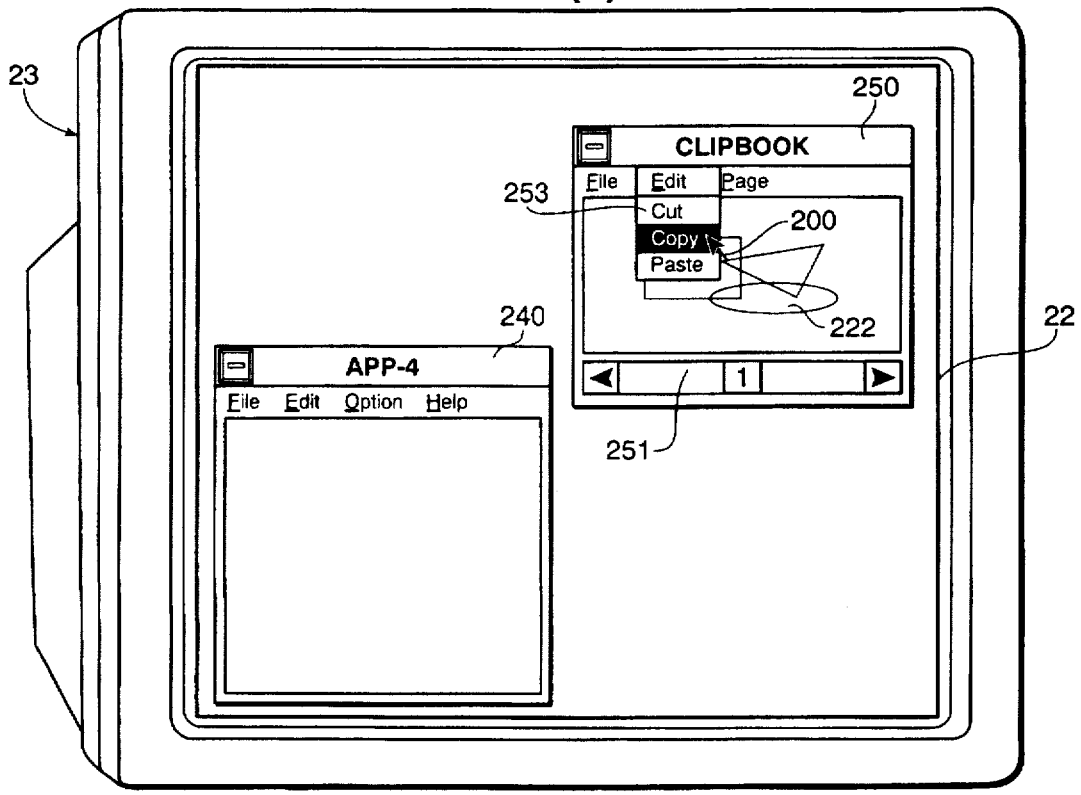
Figure 14M:
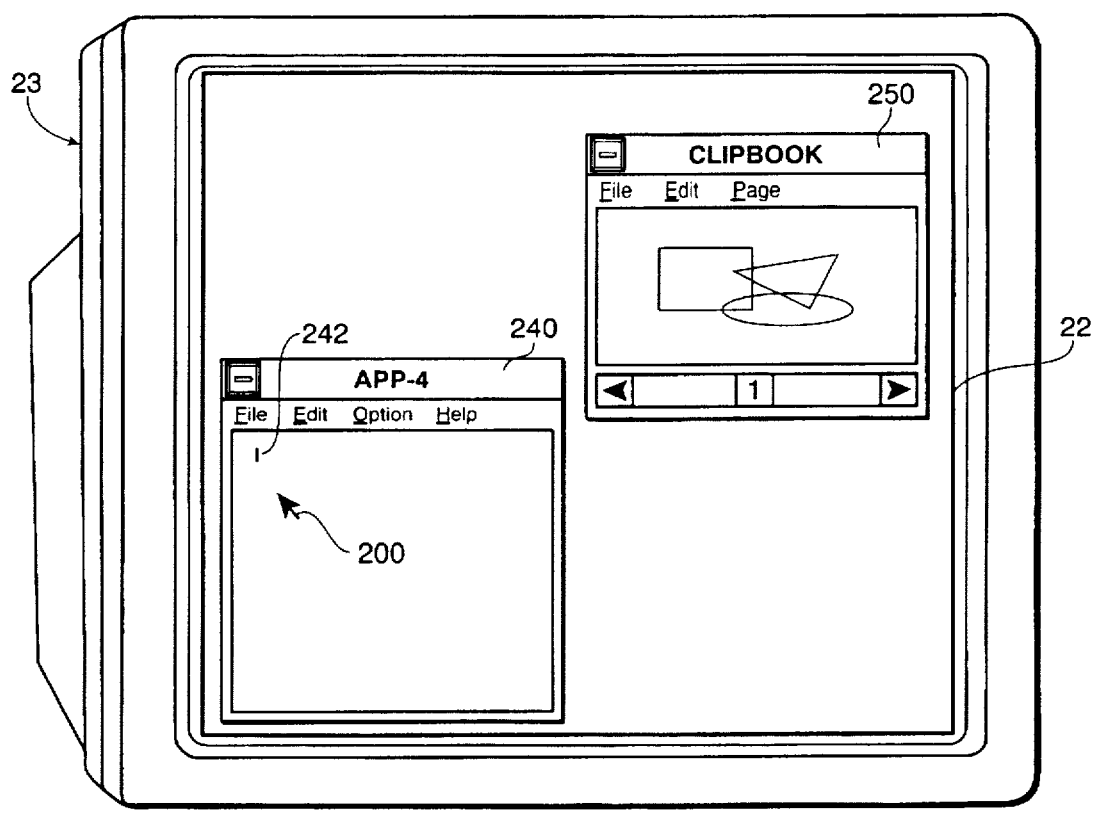
Figure 14N:
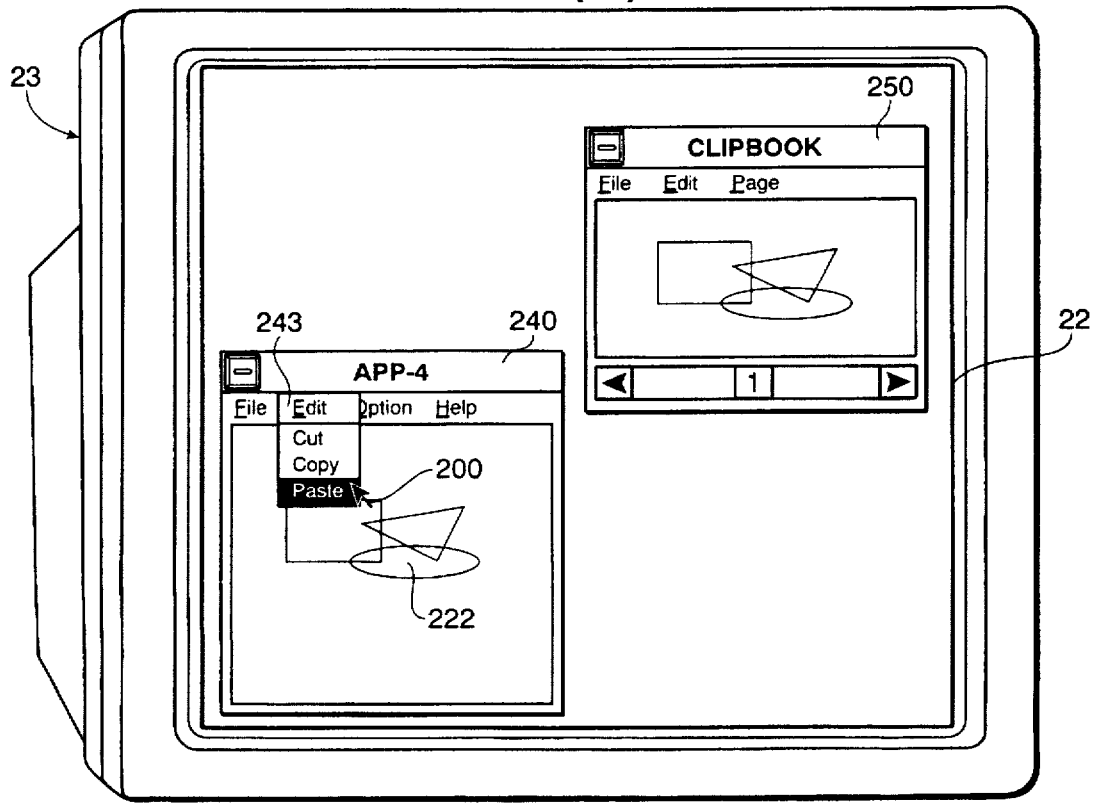
Figure 14O:
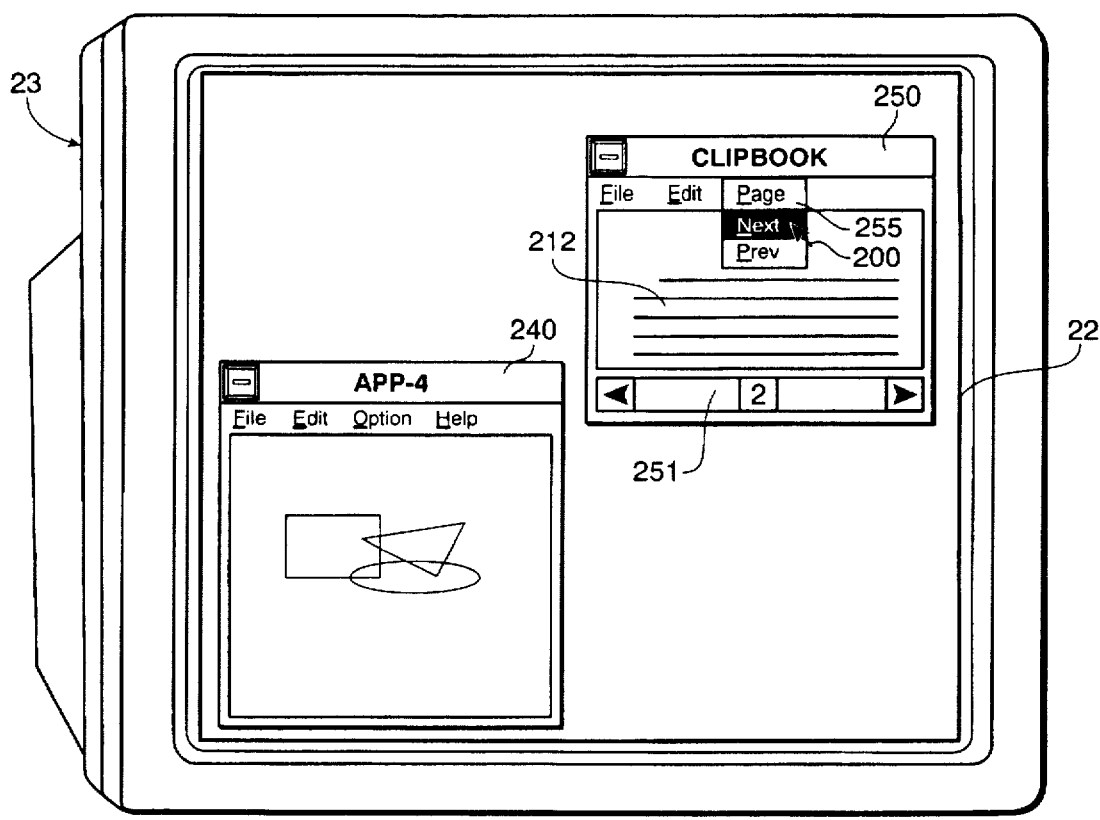
Figure 14P:
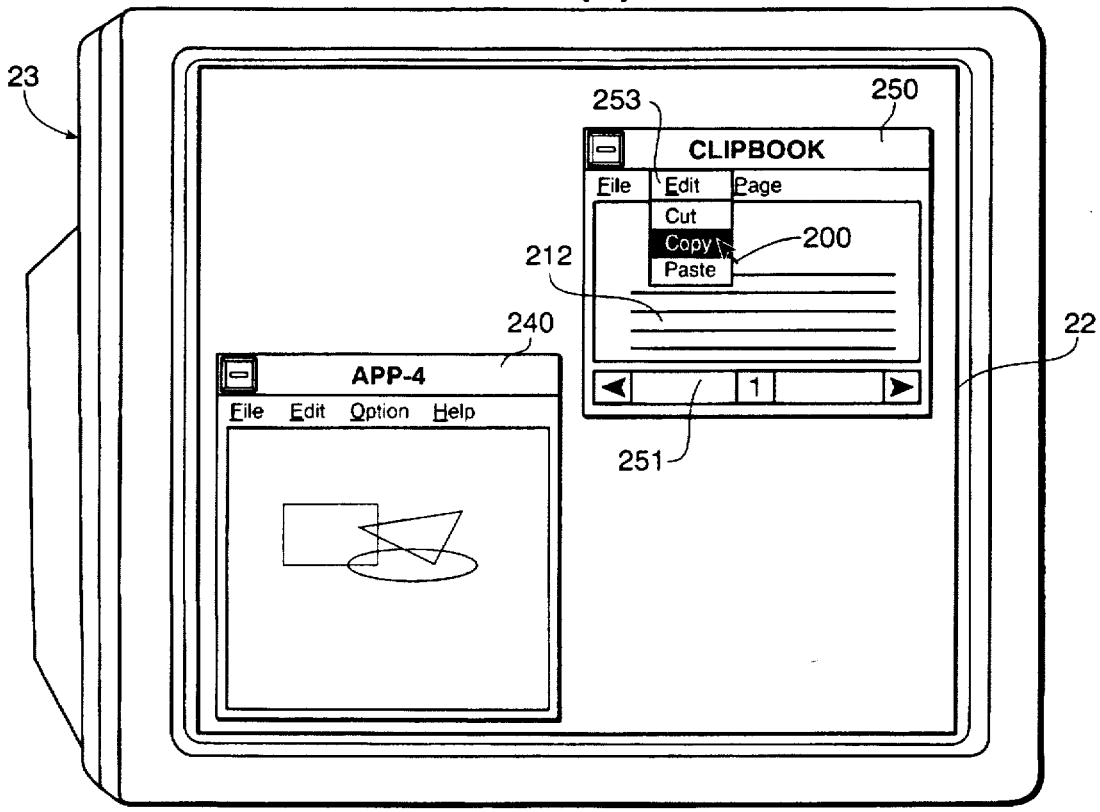
Figure 14Q:
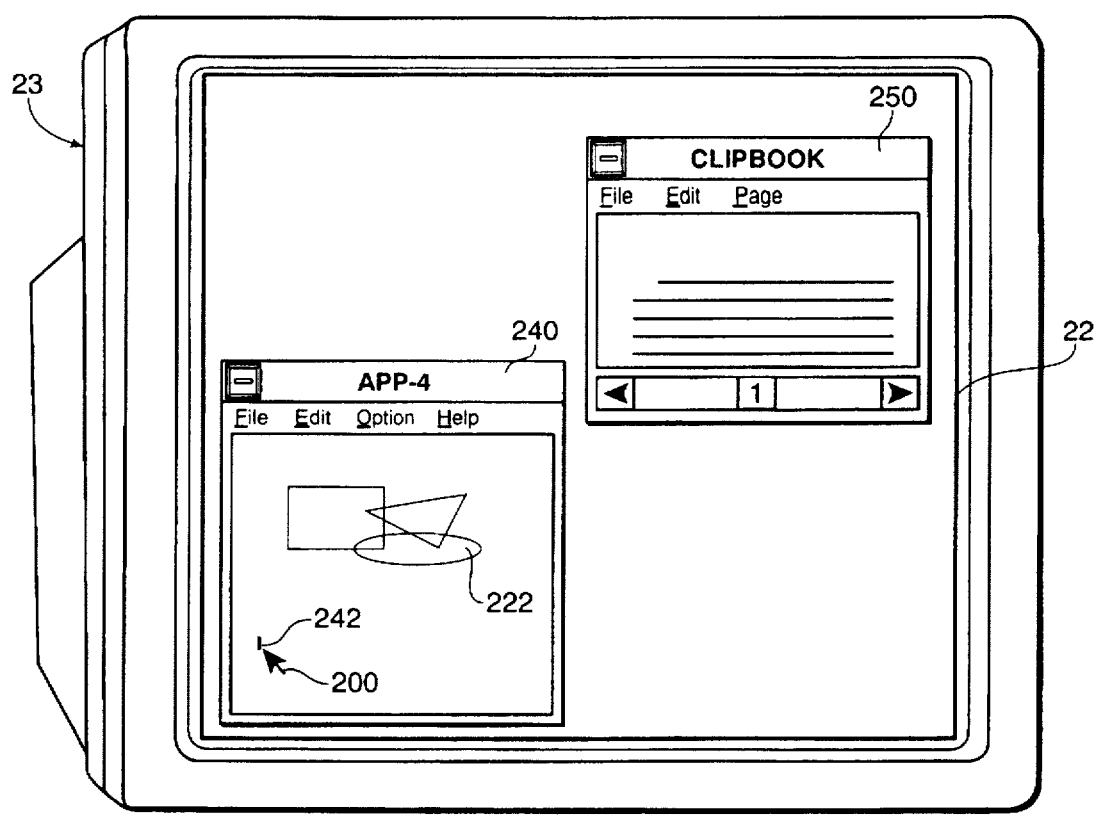
Figure 14R:
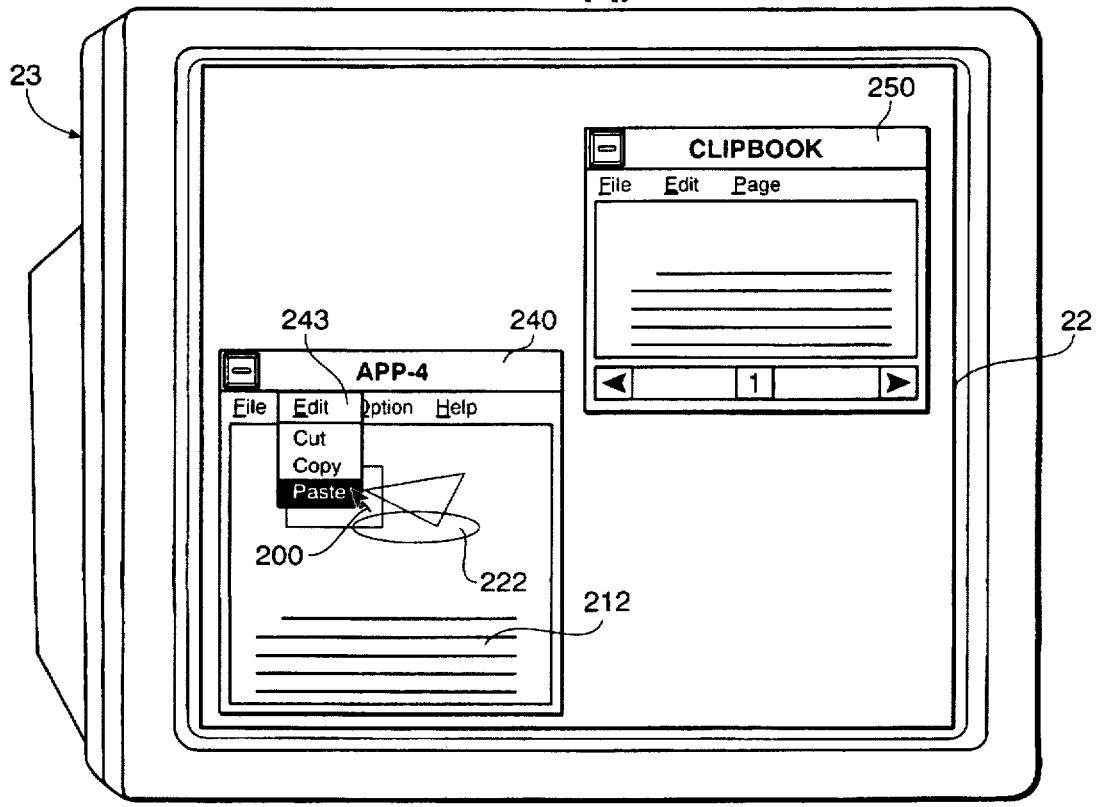

FIGS. 13(a) and 13(b) are flow charts describing the "paste" operations illustrated above. In step S1300, an application is brought into focus. In step S1301, a position is selected in the application. A "paste" operation is selected while the application is in focus in step S1302. In step S1303, one of the multiple memory buffers is selected while the application is still in focus. In step S1304, data is automatically recalled from the selected memory buffer to the selected position in the instance of the application.

As shown in FIG. 13(b), step S1303 can further comprise steps S1331, S1332, and S1333. Step S1331 determines whether or not one of the multiple buffers is explicitly selected. If one of the multiple buffers is explicitly selected, step S1332 uses the selected buffer. If one of the buffers is not explicitly selected, step S1333 selects the last buffer into which data was stored by a "copy" or "cut" operation.

|Conclusion|

The invention is described above with respect to a particular illustrated embodiment. Many variations exist. For example, the multiple memory buffers can reside in a more limited environment than an entire operating system, such as a work group consisting of a limited number of related application programs. Alternatively, the memory buffers can reside within a single application program. In addition, a different computing device (e.g., a Macintosh) can be used. A user interface can also be provided which clears selected ones of the buffers or which clears all of the buffers with a single stroke. Thus, the invention should be determined by the following claims and their legal equivalents, and should not be limited to the particular embodiment illustrated.

What is claimed is:

1. A computer implemented method for storing data from an instance of an application program into at least one of multiple memory buffers, comprising the steps of:

bringing said instance of said application program into focus;

selecting data in said instance of said application program;

while said instance of said application program is in focus, selecting a store operation;

while said instance of said application program is still in focus, selecting one of the memory buffers; and automatically storing the selected data into the selected one of the memory buffers.

2. The method of claim 1, wherein the step of selecting a store operation and the step of selecting the buffer occur simultaneously.

3. The method of claim 2, wherein a left click on a mouse simultaneously selects a store operation and a first buffer, and wherein a right click on the mouse simultaneously selects a store operation and a second buffer.

4. The method of claim 2, wherein a keystroke combination simultaneously selects a store operation and one of the multiple buffers.

5. The method of claim 4, wherein the keystroke combination is user-customizable.

6. The method of claim 1, wherein the step of selecting one of the memory buffers selects a next blank memory buffer if no one of the memory buffers is explicitly selected.

7. The method of claim 1, wherein all of the steps are performed by use of a pointing device.

8. The method of claim 1, wherein the step of selecting a memory buffer is performed by use of a menu.

9. The method of claim 8, wherein said menu includes indicators that show the type of data stored in each of the memory buffers.

10. The method of claim 1, wherein each of said multiple memory buffers is a system-wide memory buffer.

11. The method of claim 1, further comprising the step of deleting the selected data from said instance of said application program after the selected data is stored to the selected one of the memory buffers.

12. The method of claim 1, further comprising the steps of:

selecting other data in said instance of said application program;

while said instance of said application program is in focus, re-selecting the store operation;

while said instance of said application program is still in focus, selecting another one of the multiple buffers; and automatically storing the other selected data into the other selected one of the buffers.

13. The method of claim 12, further comprising the step of increasing the number of buffers after each store operation.

14. A computer implemented method for copying data from at least one of multiple memory editing buffers into an instance of an application program comprising the steps of:

bringing said instance of said application program into focus;

while said instance of said application program is in focus, selecting a recall operation;

while said instance of said application program is still in focus, selecting one of the memory buffers; and automatically recalling data from the selected one of the memory buffers to said instance of said application.

15. The method of claim 14, wherein the step of selecting a recall operation and the step of selecting the buffer occur simultaneously.

16. The method of claim 15, wherein a left click on a mouse simultaneously selects a recall operation and a first buffer, and wherein a right click on the mouse simultaneously selects a recall operation and a second buffer.

17. The method of claim 15, wherein a keystroke combination simultaneously selects a recall operation and one of the multiple buffers.

18. The method of claim 17, wherein the keystroke combination is user-customizable.

19. The method of claim 14, wherein the step of selecting one of the memory buffers selects a last buffer into which data is stored if no one of the buffers is explicitly selected.

20. The method of claim 14, wherein all of the steps are performed by use of a pointing device.

21. The method of claim 14, wherein the step of selecting a memory buffer is performed by use of a menu.

22. The method of claim 21, wherein said menu includes indicators that show the type of data stored in each of the memory buffers.

23. The method of claim 14, further comprising the step of selecting a position in said instance of said application, wherein said recalling step automatically recalls data from the selected buffer to the selected position in said application.

24. The method of claim 14, further comprising the steps of:

while said instance of said application program is in focus, re-selecting the recall operation;

while said instance of said application program is still in focus, selecting another one of the memory buffers; and automatically recalling data from the other selected one of the memory buffers to said instance of said application.

25. The method of claim 14, wherein each of said multiple memory buffers is a system-wide buffer.

26. A method for transferring data from a first application to a second application using one of multiple memory buffers comprising the steps of:

bringing said first application into focus;

selecting data from said first application;

selecting one of said multiple memory buffers while said first application remains in focus;

storing the selected data to the selected one of said buffers;

bringing said second application into focus;

re-selecting the selected one of said memory buffers while said second application is in focus; and recalling data from the re-selected one of said buffers to said second application.

27. The method of claim 26, wherein each of said memory buffers is a system-wide editing buffer.

28. Computer-executable process steps stored on a computer-readable medium, the computer executable process steps to store data from an instance of an application program into at least one of multiple memory buffers, the computer-executable process steps comprising:

code to bring the instance of the application program into focus;

code to select data in the instance of the application program;

code to select a store operation while the instance of the application program is in focus;

code to select one of the memory buffers while the instance of the application program is still in focus; and code to automatically store the selected data into the selected one of the memory buffers.

29. Computer-executable process steps according to claim 28, wherein the code to select a store operation and the code to select the buffer are executed simultaneously.

30. Computer-executable process steps according to claim 29, wherein a left click on a mouse simultaneously executes code to select a store operation and to select a first buffer, and wherein a right click on the mouse simultaneously executes code to select a store operation and to select a second buffer.

31. Computer-executable process steps according to claim 30, wherein a keystroke combination simultaneously executes code to select a store operation and to select one of the multiple buffers.

32. Computer-executable process steps according to claim 31, wherein the keystroke combination is user-customizable.

33. Computer-executable process steps according to claim 28, wherein the code to select one of the memory buffers selects a next blank memory buffer if no one of the memory buffers is explicitly selected.

34. Computer-executable process steps according to claim 28, wherein all of the code is executed in response to use of a pointing device.

35. Computer-executable process steps according to claim 28, wherein the code to select a memory buffer is executed in response to use of a menu.

36. Computer-executable process steps according to claim 35, wherein the menu includes indicators that show the type of data stored in each of the memory buffers.

37. Computer-executable process steps according to claim 28, wherein each of the multiple memory buffers is a system-wide memory buffer.

38. Computer-executable process steps according to claim 28, further comprising code to delete the selected data from the instance of the application program after the selected data is stored to the selected one of the memory buffers.

39. Computer-executable process steps according to claim 28, further comprising:

code to select other data in the instance of the application program;

code to re-select the store operation while the instance of the application program is in focus;

code to select another one of the multiple buffers while the instance of the application program is still in focus; and code to automatically store the other selected data into the other selected one of the buffers.

40. Computer-executable process steps according to claim 39, further comprising code to increase the number of buffers after each store operation.

41. Computer-executable process steps stored on a computer-readable medium, the computer executable process steps to copy data from at least one of multiple memory editing buffers into an instance of an application program, the computer-executable process steps comprising:

code to bring the instance of the application program into focus;

code to select a recall operation while the instance of the application program is in focus;

code to select one of the memory buffers while the instance of the application program is still in focus; and code to automatically recall data from the selected one of the memory buffers to the instance of the application.

13

42. Computer-executable process steps according to claim 41, wherein the code to select a recall operation and the code to select the buffer are executed simultaneously.

43. Computer-executable process steps according to claim 42, wherein a left click on a mouse simultaneously executes code to select a recall operation and to select a first buffer, and wherein a right click on the mouse simultaneously executes code to select a recall operation and to select a second buffer.

44. Computer-executable process steps according to claim 42, wherein a keystroke combination simultaneously executes code to select a recall operation and to select one of the multiple buffers.

45. Computer-executable process steps according to claim 44, wherein the keystroke combination is user-customizable.

46. Computer-executable process steps according to claim 41, wherein the code to select one of the memory buffers selects a last buffer into which data is stored if no one of the buffers is explicitly selected.

47. Computer-executable process steps according to claim 41, wherein all of the code is executed in response to use of a pointing device.

48. Computer-executable process steps according to claim 41, wherein the code to select a memory buffer is executed in response to use of a menu.

49. Computer-executable process steps according to claim 48, wherein the menu includes indicators that show the type of data stored in each of the memory buffers.

50. Computer-executable process steps according to claim 41, further comprising code to select a position in the instance of the application, wherein the code to recall automatically recalls data from the selected buffer to the selected position in the application.

51. Computer-executable process steps according to claim 41, further comprising:
    code to re-select the recall operation while the instance of the application program is in focus;
    code to select another one of the memory buffers while the instance of the application program is still in focus; and
    code to automatically recall data from the other selected one of the memory buffers to the instance of the application.

52. Computer-executable process steps according to claim 41, wherein each of the multiple memory buffers is a system-wide buffer.

53. Computer-executable process steps stored on a computer-readable medium, the computer executable process steps to transfer data from a first application to a second application using one of multiple memory buffers, the computer-executable process steps comprising:
    code to bring the first application into focus;
    code to select data from the first application;
    code to select one of the multiple memory buffers while the first application remains in focus;
    code to store the selected data to the selected one of the buffers;
    code to bring the second application into focus;
    code to re-select the selected one of the memory buffers while the second application is in focus; and
    code to recall data from the re-selected one of the buffers to the second application.

54. Computer-executable process steps according to claim 53, wherein each of the memory buffers is a system-wide editing buffer.

55. A computer-readable medium which stores computer-executable process steps, the computer-executable process steps to store data from an instance of an application program into at least one of multiple memory buffers, the computer-executable process steps comprising:
    a focusing step to bring the instance of the application program into focus;
    a selecting step to select data in the instance of the application program;
    a first selecting step to select a store operation while the instance of the application program is in focus;
    a second selecting step to select one of the memory buffers while the instance of the application program is still in focus; and
    a storing step to automatically store the selected data into the selected one of the memory buffers.

56. A computer-readable medium according to claim 55, wherein the step to select a store operation and the step to select the buffer occur simultaneously.

57. A computer-readable medium according to claim 56, wherein a left click on a mouse simultaneously selects a store operation and a first buffer, and wherein a right click on the mouse simultaneously selects a store operation and a second buffer.

58. A computer-readable medium according to claim 56, wherein a keystroke combination simultaneously selects a store operation and one of the multiple buffers.

59. A computer-readable medium according to claim 58, wherein the keystroke combination is user-customizable.

60. A computer-readable medium according to claim 55, wherein the step to select one of the memory buffers selects a next blank memory buffer if no one of the memory buffers is explicitly selected.

61. A computer-readable medium according to claim 55, wherein all of the steps are performed by use of a pointing device.

62. A computer-readable medium according to claim 55, wherein the selecting step is performed by use of a menu.

63. A computer-readable medium according to claim 62, wherein the menu includes indicators that show the type of data stored in each of the memory buffers.

64. A computer-readable medium according to claim 55, wherein each of the multiple memory buffers is a system-wide memory buffer.

65. A computer-readable medium according to claim 55, further comprising a deleting step to delete the selected data from the instance of the application program after the selected data is stored to the selected one of the memory buffers.

66. A computer-readable medium according to claim 55, further comprising:
    a first selecting step to select other data in the instance of the application program;
    a re-selecting step to re-select the store operation while the instance of the application program is in focus;
    a second selecting step to select another one of the multiple buffers while the instance of the application program is still in focus; and
    a storing step to automatically store the other selected data into the other selected one of the buffers.

67. A computer-readable medium according to claim 66, further comprising an increasing step to increase the number of buffers after each store operation.

68. A computer-readable medium which stores computer-executable process steps, the computer-executable process steps to copy data from at least one of multiple memory editing buffers into an instance of an application program, the computer-executable process steps comprising:

a focusing step to bring the instance of the application program into focus;

a first selecting step to select a recall operation while the instance of the application program is in focus;

a second selecting step to select one of the memory buffers while the instance of the application program is still in focus; and a recalling step to automatically recall data from the selected one of the memory buffers to the instance of the application.

69. A computer-readable medium according to claim 68, wherein the first selecting step and the second selecting step occur simultaneously.

70. A computer-readable medium according to claim 69, wherein a left click on a mouse simultaneously selects a recall operation and a first buffer, and wherein a right click on the mouse simultaneously selects a recall operation and a second buffer.

71. A computer-readable medium according to claim 69, wherein a keystroke combination simultaneously selects a recall operation and one of the multiple buffers.

72. A computer-readable medium according to claim 71, wherein the keystroke combination is user-customizable.

73. A computer-readable medium according to claim 68, wherein the second selecting step selects a last buffer into which data is stored if no one of the buffers is explicitly selected.

74. A computer-readable medium according to claim 68, wherein all of the steps are performed by use of a pointing device.

75. A computer-readable medium according to claim 68, wherein the second selecting step is performed by use of a menu.

76. A computer-readable medium according to claim 75, wherein the menu includes indicators that show the type of data stored in each of the memory buffers.

77. A computer-readable medium according to claim 68, further comprising a selecting step to select a position in the instance of the application, wherein the recalling step automatically recalls data from the selected buffer to the selected position in the application.

78. A computer-readable medium according to claim 68, further comprising:

a re-selecting step to re-select the recall operation while the instance of the application program is in focus;

a selecting step to select another one of the memory buffers while the instance of the application program is still in focus; and a recalling step to automatically recall data from the other selected one of the memory buffers to the instance of the application.

79. A computer-readable medium according to claim 68, wherein each of the multiple memory buffers is a system-wide buffer.

80. A computer-readable medium which stores computer-executable process steps, the computer-executable process steps to transfer data from a first application to a second application using one of multiple memory buffers, the computer-executable process steps comprising:

a first focusing step to bring the first application into focus;

a first selecting step to select data from the first application;

a second selecting step to select one of the multiple memory buffers while the first application remains in focus;

a storing step to store the selected data to the selected one of the buffers;

a second focusing step to bring the second application into focus;

a re-selecting step to re-select the selected one of the memory buffers while the second application is in focus; and a recalling step to recall data from the re-selected one of the buffers to the second application.

81. A computer-readable medium according to claim 80, wherein each of the memory buffers is a system-wide editing buffer.

* * * * *